(12) United States Patent
Mori et al.

(10) Patent No.: US 6,501,715 B2
(45) Date of Patent: Dec. 31, 2002

(54) OPTICAL PICKUP APPARATUS EMPLOYING AN ADJUSTING CIRCUIT

(75) Inventors: Kazushi Mori, Hirakata (JP); Atsushi Tajiri, Osaka-fu (JP); Yasuaki Inoue, Nagaokakyo (JP); Takenori Goto, Moriguchi (JP); Minoru Sawada, Yawata (JP); Akira Ibaraki, Hirakata (JP); Daisuke Ide, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/998,295

(22) Filed: Dec. 3, 2001

(65) Prior Publication Data

US 2002/0060971 A1 May 23, 2002

Related U.S. Application Data

(62) Division of application No. 09/725,239, filed on Nov. 29, 2000, now Pat. No. 6,339,563, which is a division of application No. 09/041,008, filed on Mar. 12, 1998, now Pat. No. 6,181,667.

(30) Foreign Application Priority Data

| | | |
|---|---|---|
| Mar. 14, 1997 | (JP) | 9-61492 |
| Mar. 14, 1997 | (JP) | 9-61493 |
| Dec. 16, 1997 | (JP) | 9-346913 |

(51) Int. Cl.$^7$ .............................................. G11B 7/095
(52) U.S. Cl. .............................. 369/44.29; 369/44.36; 369/44.37; 369/44.41
(58) Field of Search ........................ 369/44.29, 44.35, 369/44.36, 44.37, 44.41, 124.1–124.12, 44.23, 112.04–112.05

(56) References Cited

U.S. PATENT DOCUMENTS

| | | | | | |
|---|---|---|---|---|---|
| 5,005,163 | A | * | 4/1991 | Yamamoto et al. | 369/44.36 |
| 5,050,154 | A | * | 9/1991 | Shimozawa et al. | |
| 5,202,870 | A | * | 4/1993 | Aoki et al. | 369/44.35 X |
| 5,212,675 | A | * | 5/1993 | Yoshino et al. | 369/44.36 |
| 5,383,169 | A | * | 1/1995 | Shinoda et al. | 369/44.35 X |
| 5,391,865 | A | | 2/1995 | Kurata et al. | 369/44.23 X |
| 5,475,670 | A | | 12/1995 | Hamada et al. | |
| 5,777,973 | A | | 7/1998 | Yoo et al. | |
| 6,038,203 | A | * | 3/2000 | Tajiri et al. | |

* cited by examiner

*Primary Examiner*—W. R. Young
(74) *Attorney, Agent, or Firm*—Armstrong, Westerman & Hattori, LLP

(57) ABSTRACT

A grating surface of a diffraction grating diffracts a laser beam emitted from a semiconductor laser device in ±1st order directions. The grating surface is formed in a rectangular or elliptic shape in such dimensions that a light spot formed on an objective lens by ±1st order diffracted beams is located in an aperture of the objective lens and not displaced from the aperture even if the objective lens is horizontally moved in a tracking operation. A grating surface of another diffraction grating has a width smaller than the width of an overlap region of a light spot on the diffraction grating corresponding to a part of a beam, diffracted in the ±1st direction, entering an objective lens and a light spot on the diffraction grating corresponding to a part of a beam, diffracted in the −1st direction, entering the objective lens.

13 Claims, 27 Drawing Sheets

OPTICAL PICKUP APPARATUS EMPLOYING AN ADJUSTING CIRCUIT

This application is a division of prior application Ser. No. 09/725,239 filed Nov. 29, 2000, which is a division of application Ser. No. 09/041,008 filed Mar. 12, 1998, now U.S. Pat. Nos. 6,339,563 and 6,181,667, respectively.

BACKGROUND OF THE INVENTION

1. Field of the Invention

The present invention relates to an optical pickup apparatus and an optical recording medium drive employing the same.

2. Description of the Prior Art

An optical pickup apparatus employed for an optical recording medium drive such as an optical disk drive is adapted to record or read information in or from an optical recording medium such as an optical disk or detect a servo signal with a laser beam.

FIG. 20 schematically illustrates a conventional optical pickup apparatus disclosed in Japanese Patent Laying-Open Gazette No. 3-76035 (1991). This optical pickup apparatus performs tracking servo control by the three-beam method.

Referring to FIG. 20, symbols X, Y and Z denote the radial direction of an optical disk 1, the track direction of the optical disk 1, and a direction perpendicular to the disk plane of the optical disk 1 respectively.

A semiconductor laser device 102 emits a laser beam B in the direction Z. The beam B emitted from the semiconductor laser device 102 enters a diffraction grating 103. FIG. 21 is a plan view of the diffraction grating 103. The diffraction grating 103 has a grating surface 103a formed by unevenness of regular pitches. The grating surface 103a divides the incident laser beam B into three beams, i.e., a 0th order diffracted beam (main beam), a +1st order diffracted beam (subbeam) and a −1st order diffracted beam (subbeam), and transmits the same through a transmission-type holographic optical element 104.

Referring to FIG. 20, an objective lens 105 condenses the three beams transmitted through the transmission-type holographic optical element 104 on the optical disk 1. FIG. 22 is a model diagram showing the condensed states on the recording plane of the optical disk 1. As shown in FIG. 22, the 0th order diffracted beam is condensed on a track surface TR of the recording plane as a main spot M0, and the ±1st order diffracted beams are condensed on both sides of the main spot MO as subspots S1 and S2 respectively.

The transmission-type holographic optical element 104 diffracts three returned beams (reflected beams) from the main spot MO and the subspots S1 and S2 in a plane substantially including the directions X and Z, so that a photodetector 106 detects these returned beams.

FIG. 23 is a typical plan view showing an exemplary photodetector 106. This photodetector 106 includes a photodetection part 106a provided on the central portion for performing focus servo control with the astigmatism method and photodetection parts 106b and 106c provided on both sides of the photodetection part 106a for performing tracking servo control with the three-beam method. The returned beam corresponding to the main spot M0 enters the central portion of the photodetection part 106a while the returned beams corresponding to the subspots S1 and S2 enter the photodetection parts 106b and 106c respectively.

The aforementioned optical pickup apparatus performs tracking control in the following manner: As shown in FIG. 22, the track surface TR recording information is different in light reflectance from a non-track surface. When the photodetection parts 106b and 106c detect the returned beams from the subspots S1 and S2, the returned beams from the two subspots S1 and S2 entering the two photodetection parts 106b and 106c are equal in light intensity to each other if the main spot MO excellently tracks the track surface TR to be reproduced. If the main spot MO deviates to either side of the track surface TR, on the other hand, the photodetection part 106a or 106b relatively largely detects the light intensity of the returned beam from one of the subspots S1 and S2. With output signals E and F from the photodetection parts 106b and 106c, therefore, the following tracking error signal TE is obtained:

$$TE = E - F$$

The optical pickup apparatus performs excellent tracking control when the tracking error signal TE is zero, and detects deterioration of the tracking state as the value of the tracking error signal TE increases.

When detecting the tracking error signal TE, the optical pickup apparatus moves the objective lens 105 in the radial direction (the direction X), for correcting the condensed positions of the main spot M0 and the subspots S1 and S2 on the track surface TR of the optical disk 1.

FIG. 24A is a typical sectional view showing the condensed states of diffracted beams B1 and B2 diffracted by the diffraction grating 103, and FIG. 24B shows typical plan views of the objective lens 105. As shown in FIG. 24A, the diffracted beam B1 diffracted by the diffraction grating 103 in the +1st order direction passes through the objective lens 105, to be condensed as the subspot S1. The diffracted beam B2 diffracted in the −1st order direction passes through the objective lens 105, to be condensed as the subspot S2.

Referring to FIG. 24B, the grating surface 103a of the diffraction grating 103 is formed to be larger than the laser beam B, as shown in FIG. 20. Therefore, the laser beam B incident on the grating surface 103a is diffracted over a region wider than an aperture 105a of the objective lens 105, to result in regions B1a and B2a not entering the aperture 105a of the objective lens 105.

When the optical pickup apparatus performs a tracking operation in this state and moves the objective lens 105 in the direction X (the radial direction of the optical disk 1), the incident states of the diffracted beams B1 and B2 on the objective lens 105 change from those on the left to those on the right in FIG. 24B. The ratios of the diffracted beams B1 and B2 entering the aperture 105a of the objective lens 105 reduce following movement of the objective lens 105. Therefore, the light quantities of the subspots S1 and S2 reduce on the recording plane 1a of the optical disk 1, to result in reduction of the light quantities of the returned beams from the subspots S1 and S2 entering the photodetection parts 106 b and 106c. When the objective lens 105 is moved during the tracking operation, therefore, the output of the tracking error signal TE disadvantageously reduces.

FIG. 25 is a model diagram for illustrating the diffracted state of the beam B diffracted by the diffraction grating 105. Referring to FIG. 25, a light source 200 forms an emissive end of the semiconductor laser device 102, so that the laser beam B emitted from this light source 200 is condensed on the recording plane 1a of the optical disk 1 as the two subspots S1 and S2. The transmission-type holographic optical element 104 is omitted in FIG. 25.

The grating surface 103a diffracts the laser beam B emitted from the light source 200 at least in the +1st order direction and the −1st order direction. In the laser beam B, the +1st order diffracted partial beam of a partial beam BE1 passes through the objective lens 105, to be condensed as the subspot S1. The +1st order diffracted partial beam of a partial beam BE2 passes through a part beyond the objective lens 105, not to be condensed on the subspot S1.

On the other hand, the −1st order diffracted partial beam of a partial beam BE3 passes through the objective lens 105, to be condensed on the subspot S2. Further, the −1st order diffracted partial beam of a partial beam BE4 passes through a part beyond the objective lens 105, not to be condensed on the subspot S2.

When an optical axis LP passing through the peak of the light intensity distribution of the laser beam B aligns with a central axis Z0 passing through the center of the objective lens 105, the light quantities of the partial beams BE1 and BE3 condensed on the subspots S1 and S2 respectively are equal to each other. Therefore, the correct tracking state can be detected by detecting the difference between the light quantities of the returned beams from the two subspots S1 and S2.

However, the optical axis LP of the laser beam B may deviate from the central axis Z0 of the objective lens 105 due to a locational error of the semiconductor laser device 102 or the emission property of the laser beam B. When the optical axis LP deviates from the central axis Z0, the partial beams BE1 and BE3 are condensed on the two subspots S1 and S2 in non-uniform light quantities.

FIGS. 26A and 26B illustrate light intensity distribution states of the laser beam B in a section taken along the line Q—Q in FIG. 25. In FIGS. 26A and 26B, a symbol 2R denotes the diameter of the partial beam incidenting into the objective lens 105 within the +1st and the −1st order diffracted beams. The optical axis LP aligns with the central axis Z0 in FIG. 26A, while the former deviates from the latter in FIG. 26B. FIG. 26A shows the light quantities corresponding to the partial beams BE1 and BE2 in regions (E1+E2) and (E3) respectively. Further, the light quantities corresponding to the partial beams BE3 and BE4 are shown in regions (E1+E3) and (E2) respectively.

As shown in FIG. 26A, the light quantity (the region (E1+E2)) of the partial beam BE1 condensed on the subspot S1 is equal to the light quantity (the region (E1+E3)) of the partial beam BE3 condensed on the subspot S2 when the optical axis LP aligns with the central axis Z0.

When the optical axis LP deviates from the central axis Z0, on the other hand, the light quantities of the partial beams BE1 and BE3 condensed on the subspots S1 and S2, which are shown in regions (E1+E20) and (E1+E30) respectively, differ from each other. Thus, the tracking error signal TES based on the returned beams from the two subspots S1 and S2 is so offset that it is difficult to detect the correct tracking state.

FIG. 27 schematically illustrates another conventional optical pickup apparatus. This optical pickup apparatus is adapted to perform tracking servo control and focus servo control with the three-beam method and the astigmatism method respectively.

Referring to FIG. 27, a laser beam 112 emitted from a semiconductor laser device 121 passes through a transmission-type diffraction grating 123 to be divided into three beams, i.e., a 0th order diffracted beam (main beam) and ±1st order diffracted beams (subbeams) and transmitted through a transmission-type holographic optical element 124.

An objective lens 116 condenses the three beams transmitted through the transmission-type holographic optical element 124 on an optical disk 1 as a main spot M0 and subspots S1 and S2 located on both sides thereof. An actuator 140 supports the objective lens 116 to be movable in the radial direction (the X-axis direction) of the optical disk 1 for a tracking operation and to be movable in the Y-axis direction for a focus operation.

FIG. 28 illustrates the main spot M0 and the subspots S1 and S2 formed on the optical disk 1. As shown in FIG. 28, the optical system of the optical pickup apparatus is so adjusted that the main spot M0 scans a track TR to be reproduced and the subspots S1 and S2 scan both sides of the main spot M0 slightly over the track TR.

The transmission-type holographic optical element 124 diffracts three returned beams (reflected beams) from the optical disk 1, so that a signal detection photodiode 133 detects the same.

FIG. 29 is a typical plan view showing an exemplary signal detection photodiode 133. This signal detection photodiode 133 includes photodetection parts 150a to 150d provided on the central portion for performing focus servo control with the astigmatism method and photodetection parts 150e and 150f provided on both sides of the photodetection parts 150a to 150d for performing tracking servo control with the three-beam method. The returned beam (main beam) corresponding to the main spot M0 enters the central portion of the photodetection parts 150a to 150d, while returned beams (subspots) 112a and 112b corresponding to the subspots S1 and S2 enter the photodetection parts 150e and 150f respectively.

On the basis of detection signals E and F from the photodetection parts 150e and 150f of the signal detection photodiode 133 receiving the returned beams (subbeams) 112a and 112b, the optical pickup apparatus performs the tracking operation in the following manner:

FIG. 30 is a circuit diagram showing respective parts of an optical disk drive comprising the optical pickup apparatus 100 performing the tracking operation. Referring to FIG. 30, the photodetection parts 150e and 150f of the signal detection photodiode 133 of the optical pickup apparatus 100 output the detection signals E and F to an E-F processing part 155 provided on a driving circuit part 154 of the optical disk drive. With the detection signals E and F received from the photodetection parts 150e and 150f, the E-F processing part 155 obtains the following tracking error signal TE:

$$TE=E-F$$

The tracking error signal TE is inputted in an operational amplifier 158 of a servo circuit 157 through a low-pass filter 156, amplified and thereafter supplied to a tracking coil 142 of the actuator 140 of the optical pickup apparatus 100.

As shown in FIG. 27, the actuator 140 supports the objective lens 116 to be movable in the radial direction (the X-axis direction) of the optical disk 1. The actuator 140 comprises a holder 141 for holding the objective lens 116, the tracking coil 142 connected to the holder 141 to be movable in the radial direction, and a permanent magnet 144 separating from the tracking coil 142. When a driving voltage is applied to the tracking coil 142, the actuator 140 moves the objective lens 116 in the X-axis direction by electromagnetic force caused between the tracking coil 142 and the permanent magnet 144.

When the main spot M0 formed on the optical disk 1 effectively tracks the track TR to be reproduced in FIG. 28, the returned beams 112a and 112b from the two subspots S1 and S2 enter the photodetection parts 150e and 150f in equal light intensity. Therefore, the tracking error signal TE outputted from the E-F processing part 155 is zero and no driving voltage is applied to the tracking coil 142 of the actuator 140. Thus, the objective lens 116 maintains its state.

When the main spot M0 deviates to either side of the track TR to be reproduced, on the other hand, the light intensity of the returned beam 112a or 112b from the subspot S1 or S2 increases. Thus, the detection signals E and F from the photodetection parts 150e and 150f differ from each other. Therefore, the E-F processing part 155 outputs the tracking error signal TE, which in turn is amplified by the operational amplifier 158 of the servo circuit 157 so that a driving voltage is applied to the tracking coil 142 and the actuator 140 radially moves the objective lens 116 for correcting the position of the main spot M1.

In recent years, miniaturization of such an optical pickup apparatus 100 is strongly desired, and the respective elements thereof are miniaturized with reduction of the diameter of the objective lens 116. In an assembling step for the optical pickup apparatus 100, therefore, it is difficult to correctly align the objective lens 116 with the optical path of the laser beam 112.

FIG. 31 is a typical plan view showing an incident state of the laser beam 112 on the objective lens 116. In the optical pickup apparatus 100, the semiconductor laser device 121, the diffraction grating 123 and the transmission-type holographic optical element 124 are integrated into a unit independently of the objective lens 116, and these units are assembled with each other in alignment. In assembling, therefore, the optical axis of the objective lens 116 may deviate from those of the two subbeams 112a and 112b of the laser beam 112 by d along the radial direction (the X-axis direction) of the optical disk 1, as shown in FIG. 31.

Such deviation d in the mounting position of the objective lens 116 results in the following disadvantage: The optical disk drive moves the objective lens 116 by a constant distance in the radial direction of the optical disk 1 in order to search the program for a tune recorded in the optical disk 1, for example. If the optical axis of the objective lens 116 deviates from those of the subbeams 112a and 112b of the laser beam 112 by d in assembling as shown in FIG. 31, however, the subbeams 112a and 112b pass through the objective lens 116 in different light quantities following movement of the objective lens 116 for the program search, in response to the direction of movement. The light quantities of the subbeams 112a and 112b passing through the objective lens 116 extremely reduce following movement of the objective lens 116 in one direction, and hence the output of the tracking error signal TE based on the subbeams 112a and 112b passing through the objective lens 116 reduces to hinder a effective tracking operation.

FIG. 32 illustrates changes of the tracking error signal TE following movement of the objective lens 116. Referring to FIG. 32, the horizontal axis shows the direction and the distance of movement of the objective lens 116, and the vertical axis shows the tracking error signal TE. When the center of the objective lens 116 aligns with the optical axis of the laser beam 112 in the radial direction of the optical disk 1, symmetrical distribution TE0 of the tracking error signal TE is obtained following movement of the objective lens 116, as shown by a dotted line in FIG. 32. When the center of the objective lens 116 deviates from the optical axis of the laser beam 112, on the other hand, asymmetrical distribution TE1 of the tracking error signal TE is obtained depending on the direction of movement of the objective lens 116, as shown by a solid line. The tracking error signal TE reduces below an output value A necessary for tracking on a position of movement of the objective lens 116, to hinder correct program search.

In general, therefore, an offset circuit 159 is provided on one input side of the operational amplifier 158 of the servo circuit 157, in order to correct the deviation of the objective lens 116 from the optical axis of the laser beam 112. In the optical pickup apparatus 100 built into the optical disk drive, the offset circuit 159 corrects the deviation of the objective lens 116 as follows:

The offset circuit 159 moves the objective lens 116 along the radial direction toward the center and the outer periphery respectively by prescribed distances of 400 $\mu$m, for example, and detects the voltages of the tracking error signal TE. If the center of the objective lens 116 deviates from the optical axis of the laser beam 112, the tracking error signal TE1 exhibits different voltages following movement of the objective lens 116 toward the center and the outer periphery, as shown in FIG. 32. Therefore, the movement origin position (the position of the objective lens 116 performing no tracking operation) is moved for equalizing the voltages of the tracking error signal TE in movement of the objective lens 116 toward the center and the outer periphery.

The resistance value of a variable resistor 160 of the offset circuit 159 is adjusted and a driving voltage is applied to the tracking coil 142 for moving the movement origin position of the objective lens 116 in the radial direction of the optical disk 1. Further, the objective lens 116 is moved from the movement origin position along the radial direction of the optical disk 1 toward the center and the outer periphery by prescribed distances respectively, for detecting the current values of the tracking error signal TE. Adjustment of the variable resistor 160 of the offset circuit 159 is ended when the detected values of the tracking error signal TE are equal to each other in movement toward the center and the outer periphery. Thus, the deviation of the objective lens 116 from the optical axis of the laser beam 112 in the radial direction of the optical disk 1 can be corrected.

However, the optical pickup apparatus 100 may be independently manufactured and put on the market by a manufacturer different from that for the optical disk drive employing the same. In this case, therefore, the manufacturer for the optical disk drive or the like must adjust the deviation of the objective lens 116 of the optical pickup apparatus 100 with complicated assembling and adjusting operations.

SUMMARY OF THE INVENTION

An object of the present invention is to provide an optical pickup apparatus causing no output reduction of a tracking signal following movement of an objective lens in a tracking operation and an optical recording medium drive employing the same.

Another object of the present invention is to provide an optical pickup apparatus capable of suppressing offset of a tracking error signal resulting from optical axis deviation of a beam emitted from a light source and an optical recording medium drive employing the same.

Still another object of the present invention is to provide an optical pickup apparatus capable of adjusting the position of an objective lens with respect to the optical axis of a laser beam in manufacturing, an optical recording medium drive comprising the same, and a method of adjusting an optical pickup apparatus.

The optical pickup apparatus according to the present invention comprises a light source for emitting a beam, a first diffraction element having a diffraction surface for diffracting the beam emitted from the light source at least in first and second directions, and an objective lens for irradiating an optical recording medium with beams diffracted by the first diffraction element in the first and second directions respectively. The objective lens is provided to be movable along the radial direction of the optical recording medium for a tracking operation, and the diffraction surface of the first diffraction element is formed in dimensions for locating a light spot formed on the objective lens by the diffracted beams diffracted by the diffraction surface in the first and second directions respectively in an aperture of the objective lens following movement of the objective lens for the tracking operation.

Also when the objective lens is moved for the tracking operation, all diffracted beams pass through the objective lens, to be condensed on the optical recording medium. Therefore, the light quantities of the diffracted beams condensed on the optical recording medium remain unchanged regardless of movement of the objective lens. Thus, it is possible to prevent the output of a tracking error signal from fluctuation resulting from change of the light quantities of the diffracted beams on the optical recording medium resulting from to the tracking operation.

In particular, the diffraction surface of the first diffraction element is preferably formed in a rectangular shape smaller than a light spot formed on the first diffraction element by the beam emitted from the light source in dimensions for locating a rectangular light spot formed on the objective lens by the diffracted beams diffracted by the diffraction surface in the first and second directions respectively following movement of the objective lens in the aperture of the objective lens.

In this case, the rectangular light spot of the diffracted beams enters the aperture of the objective lens regardless of the movement of the objective lens. Therefore, the light quantities of the diffracted beams condensed on the optical recording medium are maintained constant also when the objective lens is moved, whereby the tracking error signal based on the diffracted beams can be prevented from fluctuation.

Particularly assuming that R and Q represent the aperture radius and the amount of movement of the objective lens respectively, L1 and L2 represent effective distances between the light source and the center of the objective lens and between the diffraction surface and the light source respectively, S represents the distance between a first virtual light source supposed to emit a straight beam equivalent to the beam diffracted in the first direction toward the objective lens and the light source or between a second virtual light source supposed to emit a straight beam equivalent to the beam diffracted in the second direction toward the objective lens and the light source, and B1 represents a limit value for the rectangular light spot formed on the objective lens in a direction perpendicular to the direction of movement of the objective lens, the width W1 of the diffraction surface of the first diffraction element in the direction perpendicular to the direction of movement of the objective lens is preferably set to satisfy:

$$W1 < 2 \times \{\sqrt{R^2 - Q^2} - S\} \times L2/L1 + 2S$$

and the width W2 of the diffraction surface in the direction of movement of the objective lens is preferably set to satisfy:

$$W2 \leq \{\sqrt{(2R)^2 - (B1)^2} - 2Q\} \times L2/L1$$

with the following limit value B1:

$$B1 = (W1 - 2S) \times L1/L2 + 2S$$

The diffraction surface satisfying the above conditions introduces all diffracted beams diffracted in the first and second directions into the aperture of the objective lens regardless of movement of the objective lens. Thus, the light quantities of the diffracted beams are prevented from variation with movement of the objective lens.

In particular, the optical pickup apparatus provided with the first diffraction element having the diffraction surface formed in a rectangular shape may further comprise a second diffraction element for transmitting the beams diffracted by the first diffraction element in the first and second directions respectively and guiding the same to the objective lens while diffracting returned beams from the optical recording medium, and a photodetector for receiving the returned beams diffracted by the second diffraction element.

In this case, the second diffraction element diffracts the returned beams, so that the returned beams from the optical recording medium can be guided to the photodetector, which in turn detects the tracking error signal.

The diffraction surface of the first diffraction element is preferably formed in an elliptic or circular shape smaller than the light spot formed on the first diffraction element by the beam emitted from the light source in dimensions for locating an elliptic light spot formed on the objective lens by the diffracted beams diffracted by the diffraction surface in the first and second directions respectively in the aperture of the objective lens following movement of the objective lens.

In this case, all elliptic or circular diffracted beams can be introduced into the aperture of the objective lens regardless of movement of the objective lens in the tracking operation.

Particularly assuming that the elliptic diffraction surface of the first diffraction element has its major axis in the direction perpendicular to the direction of movement of the objective lens, R and Q represent the aperture radius and the amount of movement of the objective lens respectively, L1 and L2 represent effective distances between the light source and the center of the objective lens and between the diffraction surface and the light source respectively, S represents the distance between a first virtual light source supposed to emit a straight beam equivalent to the beam diffracted in the first direction toward the objective lens and the light source or between a second virtual light source supposed to emit a straight beam equivalent to the beam diffracted in the second direction toward the objective lens and the light source, b represents a limit value for the radius of the elliptic light spot formed on the objective lens in the direction perpendicular to the direction of movement of the objective lens and WB represents the width of the elliptic diffraction surface in the direction perpendicular to the direction of movement of the objective lens, the width WA of the elliptic diffraction surface in the direction of movement of the objective lens is preferably set to satisfy:

$$WA \leq 2 \times \{\sqrt{b^2 Q^2/(b^2 - R^2) + b^2}\} \times L2/L1$$

where $$b = (WB - 2S) \times L1/L2 + 2S$$

Further, the width WB of the elliptic diffraction surface of the first diffraction element in the direction perpendicular to the direction of movement of the objective lens is preferably set to satisfy:

$$2 \times [L2/L1 \times \{\sqrt{R \times (R-Q)} - S\} + S] \leq WB < 2 \times [L2/L1 \times \{\sqrt{R^2 - Q^2} - S\} + S]$$

Assuming that R and Q represent the aperture radius and the amount of movement of the objective lens respectively and L1 and L2 represent effective distances between the light source and the center of the objective lens and between the diffraction surface and the light source respectively, in addition, the width WA of the elliptic diffraction surface in the direction of movement of the objective lens is preferably set to satisfy:

$$WA \leq 2 \times (R-Q) \times L2/L1$$

Assuming that S represents the distance between the first virtual light source supposed to emit a straight beam equivalent to the beam diffracted in the first direction toward the objective lens and the light source or between the second virtual light source supposed to emit a straight beam equivalent to the beam diffracted in the second direction toward the objective lens and the light source, further, the width WB of the elliptic diffraction surface of the first diffraction element in the direction perpendicular to the direction of movement of the objective lens is preferably set to satisfy:

$$WB < 2 \times [L2/L1 \times \{\sqrt{R \times (R-Q)} - S\} + S]$$

In particular, the optical pickup apparatus having the first diffraction element having the elliptically formed diffraction surface may further comprise a second diffraction element for transmitting the beams diffracted by the first diffraction element in the first and second directions respectively, guiding the same to the objective lens and diffracting the returned beams from the optical recording medium, and a photodetector for receiving the returned beams diffracted by the second diffraction element.

In this case, the second diffraction element diffracts the returned beams from the optical recording medium for guiding the same to the photodetector, so that the tracking error signal by the photodetector can be detected.

An optical pickup apparatus according to another aspect of the present invention comprises a light source for emitting a beam, a first diffraction element having a diffraction surface for diffracting the beam emitted from the light source at least in first and second directions, and an objective lens for irradiating an optical recording medium with beams diffracted by the first diffraction element in the first and second directions respectively. The width of the first diffraction element in a plane including the optical axis of the beam emitted from the light source and axes of the beams diffracted in the first and second directions respectively is set to be smaller than that of a region including a first light spot and a second light spot. The first light spot is a light spot on the first diffraction element corresponding to a part of the beam, diffracted by the first diffraction element in the first direction, entering the objective lens in the beam emitted from the light source. The second light spot is a light spot on the first diffraction element corresponding to a part of the beam, diffracted by the first diffraction element in the second direction, entering the objective lens in the beam emitted from the light source.

The beam emitted from the light source includes the beam diffracted by the diffraction surface of the first diffraction element only in the first direction to enter the objective lens, a beam diffracted only in the second direction to enter the objective lens, and a beam diffracted in the first and second directions to enter the objective lens. The width of the diffraction surface of the first diffraction element is rendered smaller than that of the region including the first and second light spots formed on the first diffraction element, whereby the part corresponding to the beam diffracted only in the first direction to enter the objective lens and that corresponding to the beam diffracted only in the second direction to enter the objective lens can be reduced in a region incident on the diffraction surface. Thus, it is possible to inhibit the light quantities of the beams diffracted in the first and second directions from non-uniformity resulting from optical axis deviation of the optical axis of the beam emitted from the light source, thereby suppressing non-uniform output of a tracking error detection signal utilizing the beams diffracted in the first and second directions respectively following optical axis deviation.

In particular, the width of the diffraction surface of the first diffraction element in the aforementioned plane is preferably set to be smaller than that of an overlap region of the first and second light spots on the first diffraction element.

In this case, the light quantities of the diffracted beams diffracted in the first and second directions respectively to enter the objective lens are equally changed even if the optical axis of the beam emitted from the light source deviates from a prescribed direction. Thus, the tracking error signal based on the diffracted beams in the first and second directions is reliably prevented from offset.

In particular, the first and second directions for diffracting the beams by the diffraction surface of the first diffraction element are preferably +1st and −1st order directions respectively.

Assuming that R represents the aperture radius of the objective lens, L1 and L2 represent effective distances between the light source and the center of the objective lens and between the diffraction surface and the light source respectively and S represents the distance between a first virtual light source supposed to emit a straight beam equivalent to the beam diffracted in the first direction toward the objective lens and the light source or between a second virtual light source supposed to emit a straight beam equivalent to the beam diffracted in the second direction toward the objective lens and the light source, the width W of the diffraction surface of the first diffraction element is preferably set to satisfy the following relation:

$$W \leq 2 \times \{(R+S) \times L2/L1 - S\}$$

When the width W of the diffraction surface of the first diffraction element is set to satisfy the above relation, the beams of the beam emitted from the light source diffracted in the first and second directions, based on a common beam part, enter the objective lens. Even if the optical axis of the beam emitted from the light source deviates, therefore, the light quantities of the diffracted beams diffracted in the first and second directions are equally changed. Thus, it is possible to prevent offset of the tracking error signal based on the beams diffracted in the first and second directions.

Assuming that X1 represents the physical distance between the light source and the center of the objective lens and d and n represent the thickness and the refractive index of the first diffraction element respectively, the effective distance L1 is defined as follows:

$$L1 = X1 - (n-1) \times d/n$$

Assuming that X2 represents the physical distance between the light source and the diffraction surface and d and n represent the thickness and the refractive index of the first diffraction element respectively, the effective distance L2 is defined as follows:

$$L2 = X2 - (n-1) \times d/n$$

An optical pickup apparatus according to still another aspect of the present invention comprises a light source emitting a beam, a first diffraction element for diffracting the beam emitted from the light source at least in first and second directions, and an objective lens for irradiating an optical recording medium with beams diffracted by the first diffraction element in the first and second directions respectively. The objective lens is provided to be movable along the radial direction of the optical recording medium for a tracking operation, and the diffraction surface of the first diffraction element is so formed that the width in a plane including the optical axis of the beam emitted from the light source and axes of the beams diffracted in the first and second directions respectively is smaller than that of a region including a first light spot and a second light spot and dimensions are set for locating a light spot formed on the objective lens by the beams diffracted by the diffraction surface in the first and second directions respectively in an aperture of the objective lens following movement of the objective lens for the tracking operation. The first light spot is a light spot on the first diffraction element corresponding to a part of the beam, diffracted by the first diffraction element in the first direction, entering the objective lens in the beam emitted from the light source and the second light spot is a light spot on the first diffraction element corresponding to a part of the beam, diffracted by the first diffraction element in the second direction, entering the objective lens in the beam emitted from the light source.

In this case, the width of the diffraction surface of the first diffraction element is rendered smaller than that of the region including the first and second light spots formed on the first diffraction element thereby reducing non-uniformity of the light quantities of the diffracted beams in the first and second directions resulting from optical axis deviation of the beam emitted from the light source, to be capable of suppressing non-uniform output of a tracking error detection signal utilizing the diffracted beams diffracted in the first and second directions resulting from optical axis deviation.

Even if the objective lens is moved for the tracking operation, all diffracted beams pass through the objective lens to be condensed on the optical recording medium. Therefore, the light quantities of the diffracted beams condensed on the optical recording medium remain unchanged regardless of movement of the objective lens. Thus, it is possible to prevent output fluctuation of the tracking error signal resulting from change of the light quantities of the diffracted beams on the optical recording medium following the tracking operation.

In particular, the width of the diffraction surface of the first diffraction element in the aforementioned plane is preferably set to be smaller than that of an overlap region of the first and second light spots formed on the first diffraction element.

In this case, the light quantities of the beams diffracted in the first and second directions to enter the objective lens are equally changed even if the optical axis of the beam emitted from the light source deviates from a prescribed direction. Thus, it is possible to reliably prevent offset of the tracking error signal based on the diffracted beams in the first and second directions.

The optical pickup apparatus may further comprise a second diffraction element for guiding the beams diffracted by the first diffraction element in the first and second directions respectively and guiding the same to the objective lens while diffracting returned beams from the optical recording medium and a photodetector for receiving the returned beams diffracted by the second diffraction element.

In this case, the second diffraction element diffracts the returned beams from the optical recording medium for guiding the same to the photodetector, so that the tracking error signal by the photodetector can be detected.

An optical pickup apparatus according to a further aspect of the present invention, which can detect a tracking state of a beam for reading information from an optical recording medium, comprises a light source for emitting the beam, a first diffraction element for dividing the beam emitted from the light source into a plurality of beams for tracking state detection, an objective lens provided to be movable in the radial direction of the optical recording medium for condensing the plurality of beams divided by the first diffraction element on the optical recording medium, a photodetector having a plurality of photodetection parts for receiving a plurality of returned beams based on the plurality of beams for tracking state detection respectively and outputting a plurality of detection signals responsive to the received light quantities, an adjusting circuit capable of changing the plurality of detection signals outputted from the plurality of photoreceiving parts of the photodetector, and a lens driving part for radially moving the objective lens in response to a prescribed signal based on the plurality of detection signals adjusted by the adjusting circuit.

The optical pickup apparatus according to this aspect of the present invention can change the plurality of detection signals for tracking state detection by the adjusting circuit for moving the objective lens by the prescribed signal based on the changed detection signals. Thus, it is possible to correct deviation of the objective lens by adjusting the adjusting circuit for changing the detection signals in correspondence to the amount of deviation of the central portion of the objective lens from the optical axis of the beam.

Further, the optical pickup apparatus itself is provided with the adjusting circuit, whereby the adjusting circuit can be adjusted in an assembling stage of the optical pickup apparatus. Thus, adjustment for correcting deviation of the objective lens can be omitted in an apparatus assembled with the optical pickup apparatus.

In particular, the adjusting circuit preferably includes a variable resistor for changing the plurality of detection signals outputted from the plurality of photoreceiving parts of the photodetector.

In this case, the resistance value of the variable resistor can be so adjusted as to readily change the prescribed signal supplied to the lens driving part, for correcting deviation of the objective lens.

In particular, the optical pickup apparatus may further comprise a wiring part for extracting the signals from the plurality of photoreceiving parts of the photodetector, so that the variable resistor is arranged on the wiring part.

In this case, it is possible to readily change the prescribed signal supplied to the lens driving part by adjusting the resistance value of the variable resistor arranged on the wiring part, for correcting deviation of the objective lens.

In particular, the wiring part is preferably formed on a flexible circuit board. In this case, the degree of freedom in mounting of the wiring part in the optical pickup apparatus is improved due to the flexibility of the flexible circuit board, so that the optical pickup apparatus can be minimized.

In particular, the optical pickup apparatus preferably further comprises a plurality of amplifier parts provided in correspondence to the plurality of photoreceiving parts in the photodetector for amplifying differences between the detection signals outputted from the corresponding photoreceiving parts and a reference signal respectively, and the adjusting circuit preferably includes a variable resistor for changing the reference signal supplied to at least one of the plurality of amplifier parts.

In this case, it is possible to readily change the prescribed signal supplied to the lens driving part by adjusting the variable resistor and changing the reference signal, for correcting deviation of the objective lens.

In particular, the photoreceiving parts and the plurality of amplifier parts are formed on a single chip. In this case, the optical pickup apparatus is suitable for miniaturization.

The optical recording medium drive according to the present invention, which is adapted to optically read information from an optical recording medium, comprises a rotation driving part for rotating the optical recording medium, an optical pickup apparatus for irradiating the optical recording medium with a laser beam and receiving a returned beam from the optical recording medium, a pickup driving part for moving the optical pickup apparatus in the radial direction of the optical recording medium, and a signal processing part for processing an output signal from the optical pickup apparatus. Further, the optical pickup apparatus comprises a light source for emitting the beam, a diffraction element having a diffraction surface for diffracting the beam emitted from the light source at least in first and second directions, and an objective lens for irradiating the optical recording medium with beams diffracted by the diffraction element in the first and second directions respectively. The objective lens is provided to be movable along the radial direction of the optical recording medium for a tracking operation, and the diffraction surface of the diffraction element is formed in dimensions for locating a light spot formed on the objective lens by the beams diffracted by the diffraction surface in the first and second directions respectively in an aperture of the objective lens following movement of the objective lens for the tracking operation.

Thus, the light quantities of the diffracted beams on the optical recording medium remain unchanged in the tracking operation, and an optical recording medium drive causing no output reduction of a tracking error signal can be obtained.

An optical recording medium drive unit according to a further aspect of the present invention, which is adapted to optically read information from an optical recording medium, comprises a rotation driving part for rotating the optical recording medium, an optical pickup apparatus for irradiating the optical recording medium with a laser beam and receiving a returned beam from the optical recording medium, a pickup driving part for moving the optical pickup apparatus in the radial direction of the optical recording medium, and a signal processing part for processing an output signal from the optical pickup apparatus. Further, the optical pickup apparatus comprises a light source for emitting the beam, a diffraction element having a diffraction surface for diffracting the beam emitted from the light source at least in first and second directions, and an objective lens for irradiating the optical recording medium with beams diffracted by the diffraction element in the first and second directions respectively. The width of the diffraction surface of the diffraction element in a plane including the optical axis of the beam emitted from the light source and axes of the beams diffracted in the first and second directions is set to be smaller than the width of a region including a first light spot and a second light spot. The first light spot is a light spot on the diffraction element corresponding to a part of the beam, diffracted by the diffraction element in the first direction, entering the objective lens in the beam emitted from the light source and the second light spot is a light spot on the diffraction element corresponding to a part of the beam, diffracted by the diffraction element in the second direction, entering the objective lens in the beam emitted from the light source.

In this case, offset of a tracking error signal is prevented even if the optical axis of the beam from the light source in the optical pickup apparatus deviates, whereby no offset adjustment is required and correct tracking control can be performed.

An optical recording medium drive according to a further aspect of the present invention, which is adapted to optically read information from an optical recording medium, comprises a rotation driving part for rotating the optical recording medium, an optical pickup apparatus for irradiating the optical recording medium with a laser beam and receiving a returned beam from the optical recording medium, a pickup driving part for moving the optical pickup apparatus in the radial direction of the optical recording medium, and a signal processing part for processing an output signal from the optical pickup apparatus. Further, the optical pickup apparatus comprises a light source for outputting the beam, a diffraction element for dividing the beam emitted from the light source into a plurality of beams for tracking state detection, an objective lens provided to be movable in the radial direction of the optical recording medium for condensing the plurality of beams divided by the diffraction element on the optical recording medium, a photodetector having a plurality of photoreceiving parts for receiving a plurality of returned beams based on the plurality of beams for tracking state detection condensed on the optical recording medium respectively for outputting detection signals responsive to the received light quantities, an adjusting circuit capable of changing the plurality of detection signals outputted from the plurality of photoreceiving parts of the photodetector, and a lens driving part for radially moving the objective lens in response to a prescribed signal based on the plurality of detection signals adjusted by the adjusting circuit.

The optical pickup apparatus adjusted to output a tracking signal for correcting deviation of the objective lens is assembled into the optical recording medium drive according to the present invention, whereby no adjustment of deviation of the objective lens of the optical pickup apparatus is required after assembling and the optical recording medium drive is easy to assemble.

The method of adjusting an optical pickup apparatus according to the present invention, which is adapted to correct deviation of a central portion of an objective lens with respect to the optical axes of a plurality of beams in the radial direction of an optical recording medium in the optical pickup apparatus comprising a light source for emitting a beam, a diffraction element for dividing the beam emitted from the light source into the plurality of beams for tracking state detection, the objective lens for condensing the plurality of beams divided by the diffraction element on the optical recording medium, a lens driving part for moving the objective lens in the radial direction of the optical recording medium, and a photodetector having a plurality of photoreceiving parts for receiving a plurality of returned beams based on the plurality of beams for tracking state detection condensed on the optical recording medium respectively and outputting a plurality of detection signals responsive to the received light quantities, provides the optical pickup apparatus with an adjusting circuit capable of changing the detection signals outputted from the plurality of photoreceiving parts, connects a driving circuit for generating a driving signal for moving the objective lens in the radial direction on the basis of the detection signals outputted from the photodetector through the adjusting circuit to the lens driving part of the optical pickup apparatus, moves the objective lens in the radial direction by changing the detection signals with the adjusting circuit and thereafter observes change of the detection signals while radially moving the objective lens by a prescribed distance, thereby correcting deviation of the central portion of the objective lens with respect to the optical axes of the plurality of beams in the radial direction of the optical recording medium.

The method of adjusting an optical pickup apparatus according to the present invention connects the previously prepared driving circuit to the lens driving part of the optical pickup apparatus, changes the plurality of detection signals for tracking state detection with the adjusting circuit, and moves the objective lens by the prescribed signal based on the changed detection signals. The method further reciprocates the objective lens in the radial direction by prescribed distances for inspecting the state of deviation of the objective lens, obtains the current detection signals, and observes change of the detection signals. The adjusting circuit adjusts the detection signals to attain desired values. Thus, it is possible to correct deviation of the central portion of the objective lens by adjusting the adjusting circuit to change the detection signals in response to the amount of deviation of the mounting position of the objective lens with respect to the optical axes of the beams.

Further, the optical pickup apparatus itself is provided with the adjusting circuit, whereby the adjusting circuit can be adjusted in an assembling stage of the optical pickup apparatus. Thus, adjustment for correcting deviation of the central portion of the objective lens of the optical pickup apparatus can be omitted in the apparatus assembled with the optical pickup apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (1) First Embodiment

Figure 1:
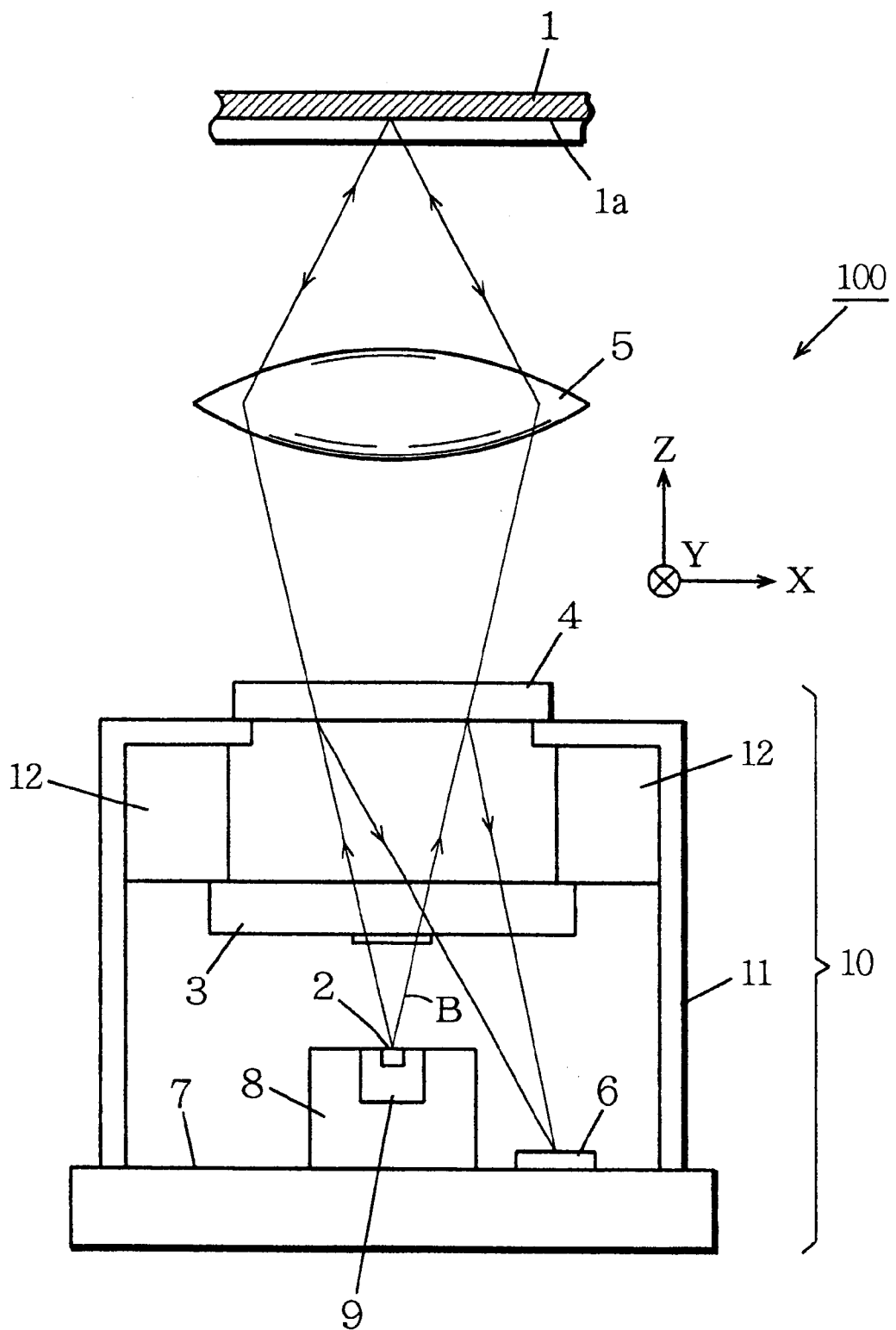
FIG. 1 is a schematic block diagram showing an optical pickup apparatus according to a first embodiment of the present invention.

An optical pickup apparatus 100 shown in FIG. 1 is adapted to perform focus servo control with the astigmatism method and tracking servo control with the three-beam method.

Referring to FIG. 1, symbols X, Y and Z denote the radial direction of a reflection type optical disk 1 such as a CD (compact disk), the track direction of the optical disk 1 and a direction perpendicular to a recording plane 1a of the optical disk 1 respectively.

The optical pickup apparatus 100 comprises a projecting/photoreceiving unit 10 and an objective lens 5. The projecting/photoreceiving unit 10 is formed by a semiconductor laser device 2, a transmission-type diffraction grating 3, a transmission-type holographic optical element 4 and a photodetector 6. A block 8 is provided on a base 7, and a heat sink 9 is mounted on a side surface of the block 8. The semiconductor laser device 2 is mounted on a surface of the heat sink 9.

The transmission-type diffraction grating 3 is made of optical glass or optical resin, and arranged in a holder 11 through a spacer 12. The transmission-type holographic optical element 4 is arranged in an opening on an upper surface of the holder 11.

The semiconductor laser device 2 emits a laser beam B in the direction Z. The diffraction grating 3 divides the beam B emitted from the semiconductor laser device 2 into three beams, i.e., a 0th order diffracted beam (main beam), a +1st order diffracted beam (subbeam) and a −1st order diffracted beam (subbeam) in a plane, perpendicular to the plane of FIG. 1, substantially including the directions Y and Z, and transmits the same through the transmission-type holographic optical element 4. FIG. 1 illustrates the three beams as a single beam.

Figure 22:
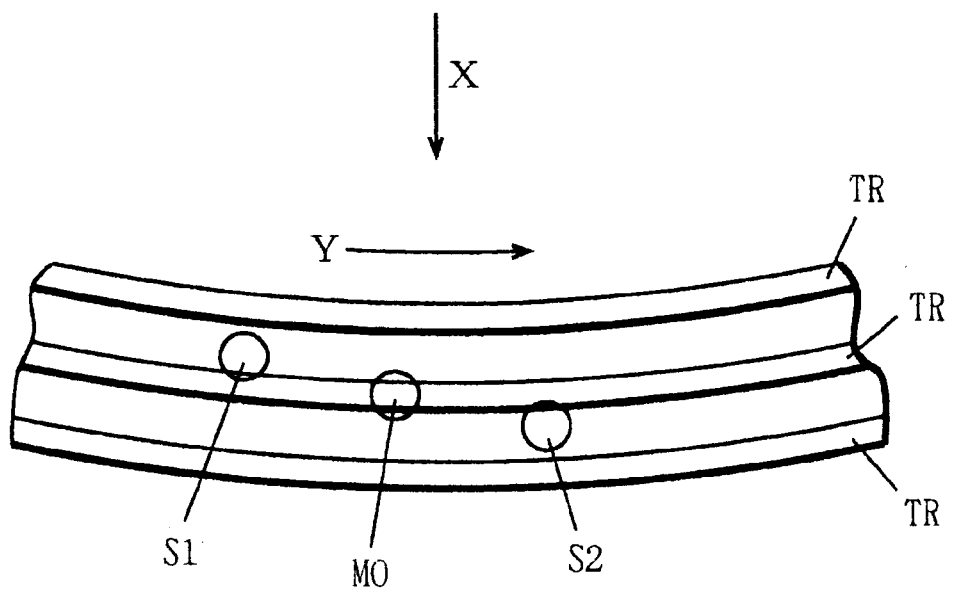
FIG. 22 is a model diagram showing condensed states on an optical disk.

The objective lens 5 is supported to be movable in the radial direction (the direction X) of the optical disk 1 for tracking servo control, and to be movable in the vertical direction (the direction Z) for focus servo control. The objective lens 5 condenses the main beam and the two subbeams diffracted and transmitted through the transmission-type holographic optical element 4 in the 0th and ±1st orders respectively on the optical disk 1 as a main spot M0 and subspots S1 and S2 positioned on both sides thereof respectively (see FIG. 22).

The transmission-type holographic optical element 4 diffracts three returned beams (reflected beams) from the optical disk 1 in a plane substantially including the directions X and Z in the 1st order and introduces the same into the photodetector 6. At this time, the transmission-type holographic optical element 4 supplies the three returned beams from the optical disk 1 with astigmatism respectively.

Figure 23:
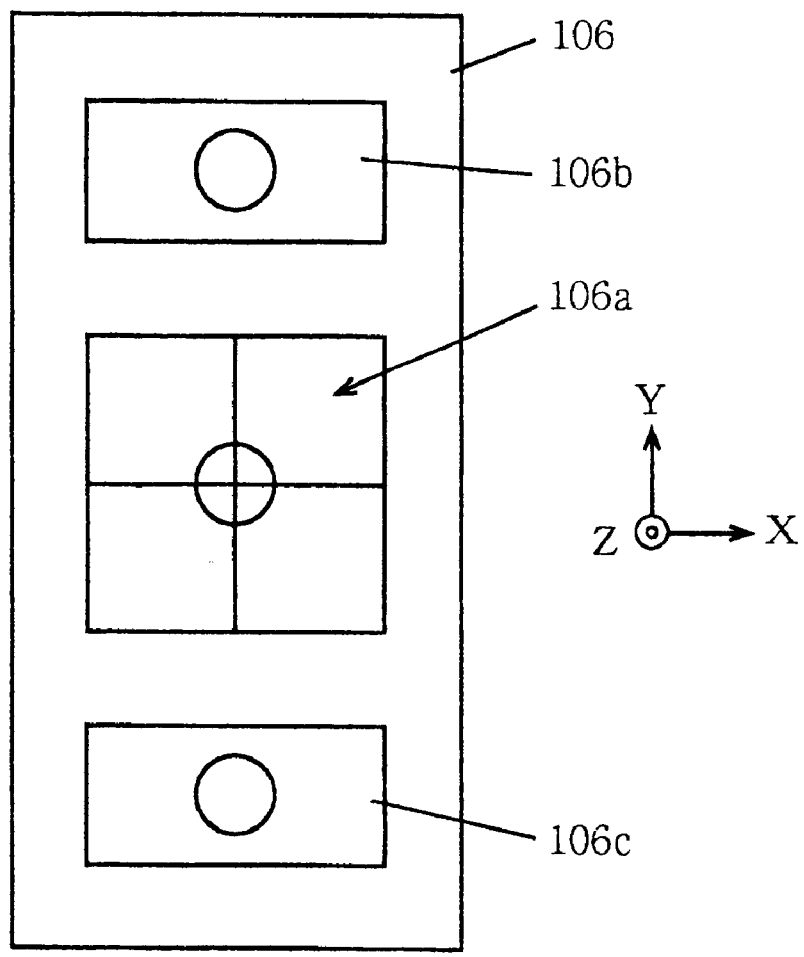
FIG. 23 is a plan view showing the structure of a conventional photodetector.

The photodetector 6, which is similar in structure to the photodetector 106 of the conventional optical pickup apparatus 100 shown in FIG. 23, outputs an information reproduction signal and a focus signal on the basis of the returned beam from the main spot M0 on the optical disk 1 while outputting a tracking error signal TE on the basis of the returned beams from the subspots S1 and S2.

In the optical pickup apparatus 100 according to this embodiment, the shape and dimensions of a grating surface 3a of the diffraction grating 3 are so set that a light spot formed by the ±1st order diffracted beams entering the objective lens 5 is not displaced beyond its aperture 5a following movement of the objective lens 5 in the radial direction (the direction X) of the optical disk 1 for a tracking operation. A method of setting the grating surface 3a is now described.

(1) Rectangular Grating Surface 3a

Figure 2A:
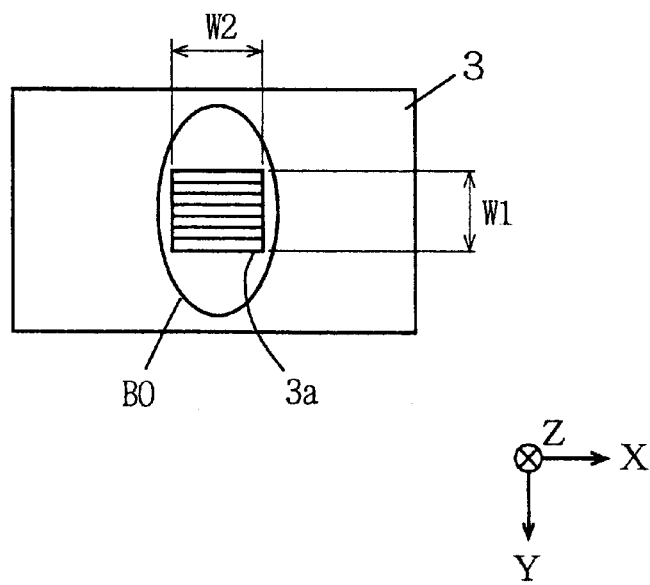
FIG. 2A is a plan view of a diffraction grating.
Figure 2B:
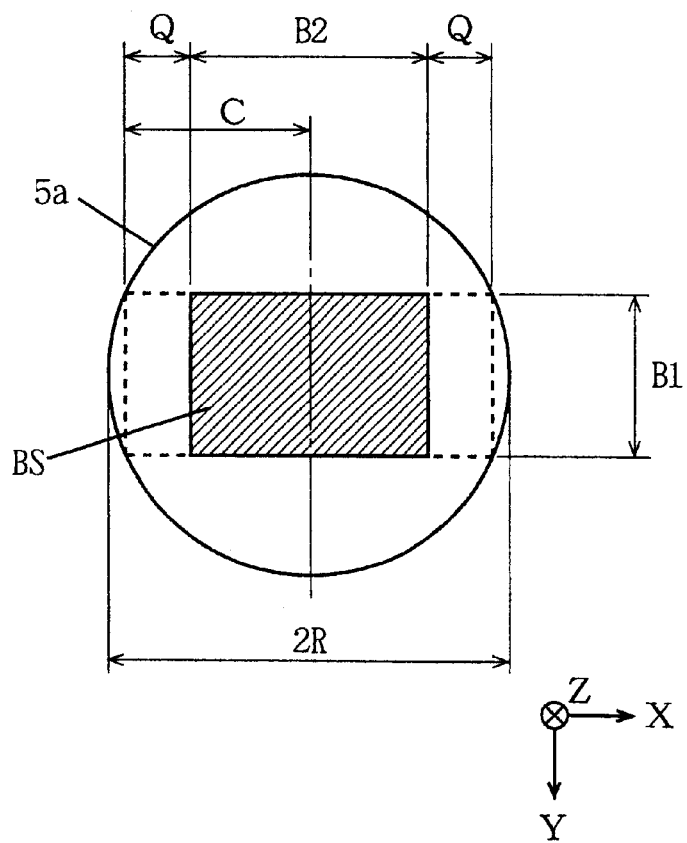
FIG. 2B is a plan view showing incident states of diffracted beams, diffracted by the diffraction grating, on an objective lens.
Figure 3:
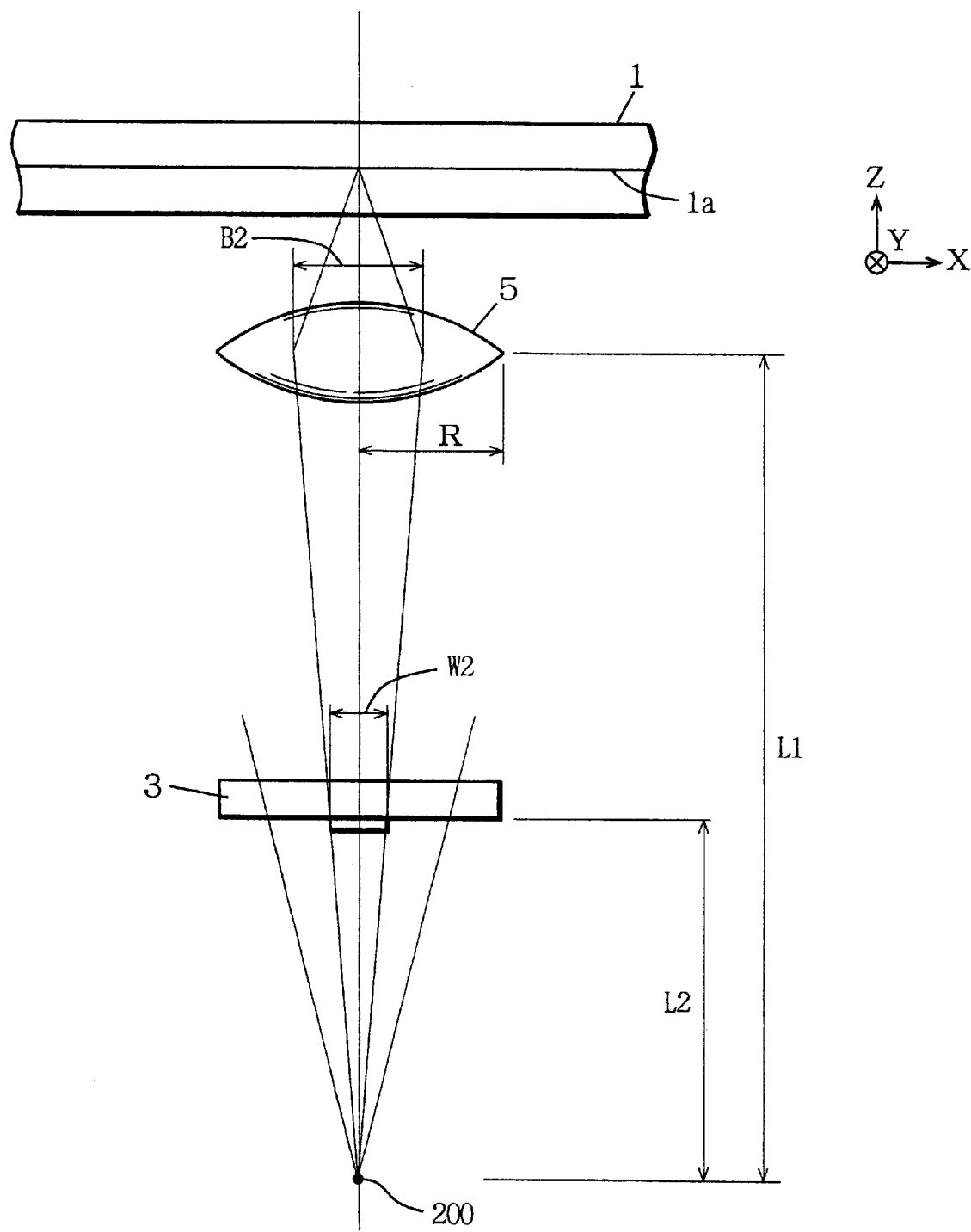
FIG. 3 is a typical X-Z sectional view showing an optical disk irradiated with a laser beam.
Figure 4:
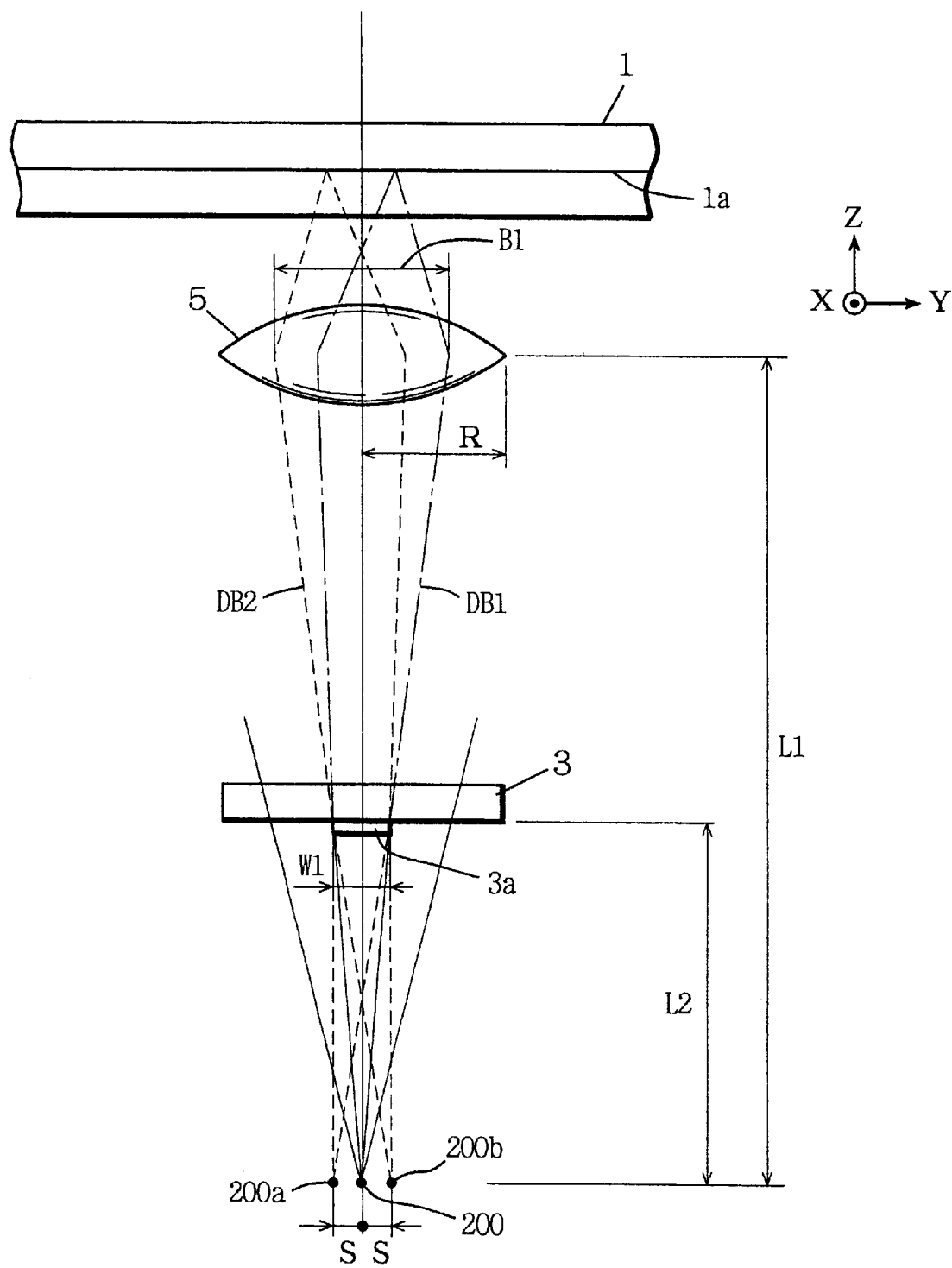
FIG. 4 is a typical Y-Z sectional view showing the optical disk irradiated with the laser beam.

FIG. 2A is a plan view of the diffraction grating 3, and FIG. 2B is a plan view showing incident states of the diffracted beams, diffracted by the diffraction grating 3 shown in FIG. 2A, on the objective lens 6. FIG. 3 is a typical X-Z sectional view showing the optical disk 1 irradiated with the laser beam B, and FIG. 4 is a typical Y-Z sectional view similar to FIG. 3.

Referring to FIG. 2A, the grating surface 3a of the diffraction grating 3 is formed in a rectangular shape having a vertical dimension W1 in the direction (the Y-Z plane direction) for diffracting the laser beam B and a transverse dimension W2 in the direction of movement (the direction X) of the objective lens 5, with irregularities extending in the direction X at regular pitches. The grating surface 3a is formed to be smaller than a light spot B0 formed on the grating surface 3a by the laser beam B emitted from the semiconductor laser device 2.

The diffracted beams diffracted by the grating surface 3a in the ±1st order directions form a rectangular light spot BS in the aperture 5a of the objective lens 5, as shown in FIG. 2B. Namely, the diffracted beams transmitted through and diffracted by the rectangular grating surface 3a having the vertical and transverse dimensions W1 and W2 form the rectangular light spot BS having vertical and transverse dimensions B1 and B2 in the aperture 5a of the objective lens 5.

It is assumed here that the vertical dimension B1 of the light spot BS on the objective lens 5 has a given maximum dimension. The amount Q of movement of the objective lens 5 in the tracking operation is previously defined.

Therefore, the diffraction grating surface 3a may be so set that the vertical dimension W1 is less than the maximum value of the vertical dimension B1 of the light spot BS and the transverse dimension W2 is at such a value that the light spot BS is not displaced beyond the aperture 5a of the objective lens 5 when relatively moved by Q in the direction X following movement of the objective lens 5.

Referring to FIG. 2B, the vertical dimension B1 of the light spot BS on the objective lens 5 is first given. The light spot BS is not displaced beyond the aperture 5a of the objective lens 5 following movement of the objective lens 5 by Q in the direction X under the following condition:

$$B2/2 \leq C-Q \tag{1}$$

In the above expression, the variable C is expressed as follows:

$$C = \sqrt{R^2 - (B1/2)^2} \tag{2}$$

Hence, the following relation is obtained for the transverse dimension B2 of the light spot BS:

$$B2 \leq \sqrt{(2R)^2 - B1^2} - 2Q \tag{3}$$

Hence, the transverse dimension W2 of the grating surface 3a corresponding to the transverse dimension B2 of the light spot BS on the objective lens 5 is obtained as follows, on the basis of the geometric conditions of the optical system shown in FIG. 3:

$$W2 = B2 \times L2/L1 \tag{4}$$

From the expressions (3) and (4), the following relation is obtained for the transverse dimension W2 of the grating surface 3a:

$$W2 \leq \{\sqrt{(2R)^2 - (B1)^2} - 2Q\} \times L2/L1 \tag{5}$$

where $$B1 = (W1 - 2S) \times L1/L2 + 2S$$

The vertical dimension W1 of the grating surface 3a is obtained in the following manner: B2>0 holds for the transverse dimension B2 of the light spot BS in the expression (3), and hence:

$$\sqrt{(2R)^2 - B1^2} - 2Q > 0 \tag{6}$$

Hence, $$B1 < 2 \times \sqrt{R^2 - Q^2} \quad (7)$$

This is the limit condition for the vertical dimension B1 of the light spot BS on the objective lens 5 previously given as the maximum value.

As to the vertical dimension W1 of the grating surface 3a corresponding to the vertical dimension B1 of the light spot BS formed on the objective lens 5, the following relation holds on the basis of the geometric conditions of the optical system shown in FIG. 4:

$$W1 = (B1 - 2S) \times L2/L1 + 2S \quad (8)$$

Substitution of this relation into the expression (7) gives:

$$W1 < 2 \times \{\sqrt{R^2 - Q^2} - S\} \times L2/L1 + 2S \quad (9)$$

In the above expressions (5) and (9), R and S represent the aperture radius of the objective lens 5 and the distance between the effective positions of a virtual light source 200a supposed to emit the same beam as a +1st diffracted beam DB1 when no grating surface 3a is provided in FIG. 4 and the light source or between those of a virtual light source 200b supposed to emit the same beam as a −1st diffracted beam DB2 and the light source 200, and L1 and L2 represent effective distances between the center of the objective lens 5 and the light source 200 and between the grating surface 3a of the diffraction grating 3 and the light source 200 respectively.

Figure 5:
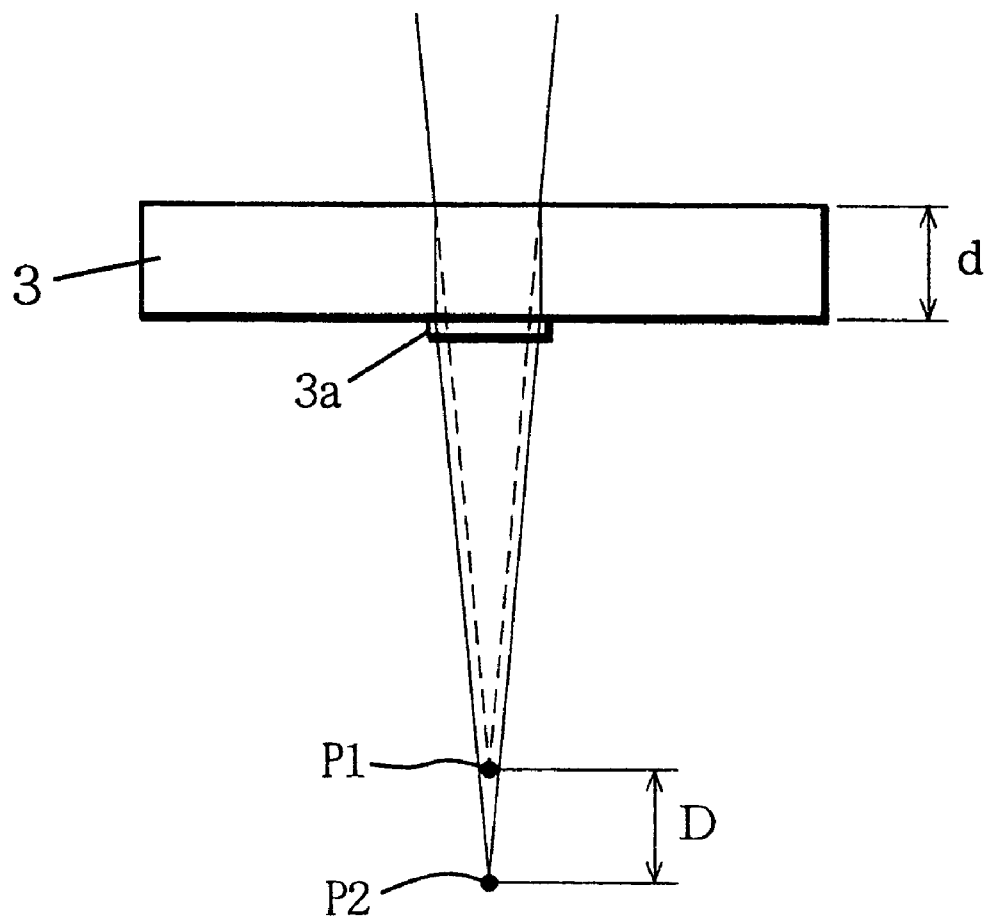
FIG. 5 is an explanatory diagram showing the relation between effective and actual positions of a light source.

The term "effective positions" indicates the position of the light source emitting the same beam in case of receiving influence by the refractive index of the diffraction grating 3 as a beam in case of neglecting influence by the refractive index of it. For example, FIG. 5 shows the relation between the effective position and the actual position of the light source 200 (the emissive end of the semiconductor laser device 2). Assuming that n and d represent the refractive index and the thickness of the diffraction grating 3 respectively, the distance D between the effective and actual positions P1 and P2 of the light source 200 shown in FIG. 5 is obtained as follows:

$$D = (n-1) \times d/n \quad (10)$$

Further, the following relation holds between the effective distance L1 between the center of the objective lens 5 and the light source 200 and the physical distance X1 between the center of the objective lens 5 and the actual position of the light source 200:

$$L1 = X1 - D = X1 - (n-1) \times d/n$$

In addition, the following relation holds between the effective distance L2 between the grating surface 3a of the diffraction grating 3 and the effective position of the light source 200 and the physical distance X2 between the grating surface 3a of the diffraction grating 3 and the actual position of the light source 200:

$$L2 = X2 - D = X2 - (n-1) \times d/n$$

Assuming that λ and Λ represent the wavelength of the laser beam B and the grating cycle of the diffraction grating of the grating surface 3a respectively, L2 represents the effective distance between the effective position of the light source 200 and the surface of the diffraction grating 3 closer to the light source 200, and d and n represent the thickness of a substrate for the diffraction grating 3 and its refractive index respectively, the distance S between the effective positions of the light source 200 and the virtual light sources 200a and 200b for the ±1st order diffracted beams in the expressions (5) and (9) is obtained through the following expression (11) or (12) when the grating surface 3a is located on the surface of the diffraction grating 3 closer to the light source 200 or the objective lens 5:

$$S = \{L2 + (n-1) \times d/n\} \times \tan\{\sin^{-1}(\lambda/\Lambda)\} \quad (11)$$

$$S = \{L2 + d\} \times \tan\{\sin^{-1}(\lambda/\Lambda)\} \quad (12)$$

The grating surface 3a satisfying the above relation can prevent the ±1st order diffracted beams diffracted and transmitted through the same from displacement beyond the aperture 5a of the objective lens 5 following movement of the objective lens 5 by Q in the direction X for the tracking operation.

Figure 6A:
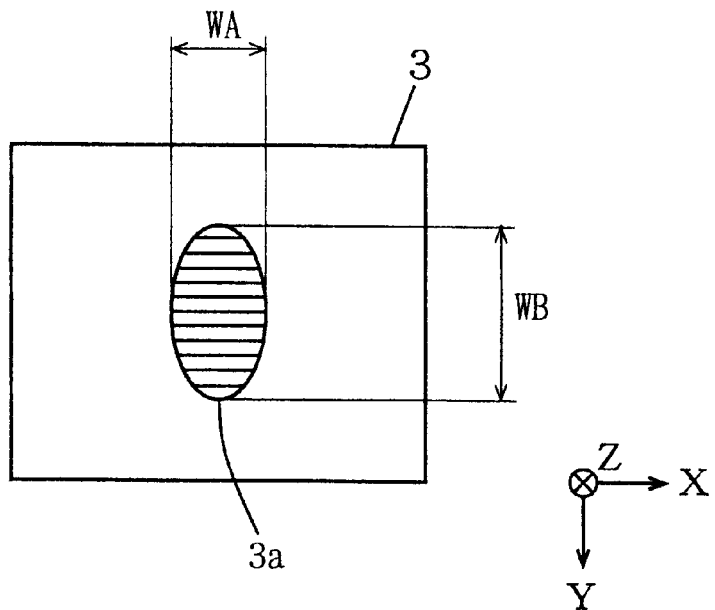
FIG. 6A is a plan view of another diffraction grating.
Figure 6B:
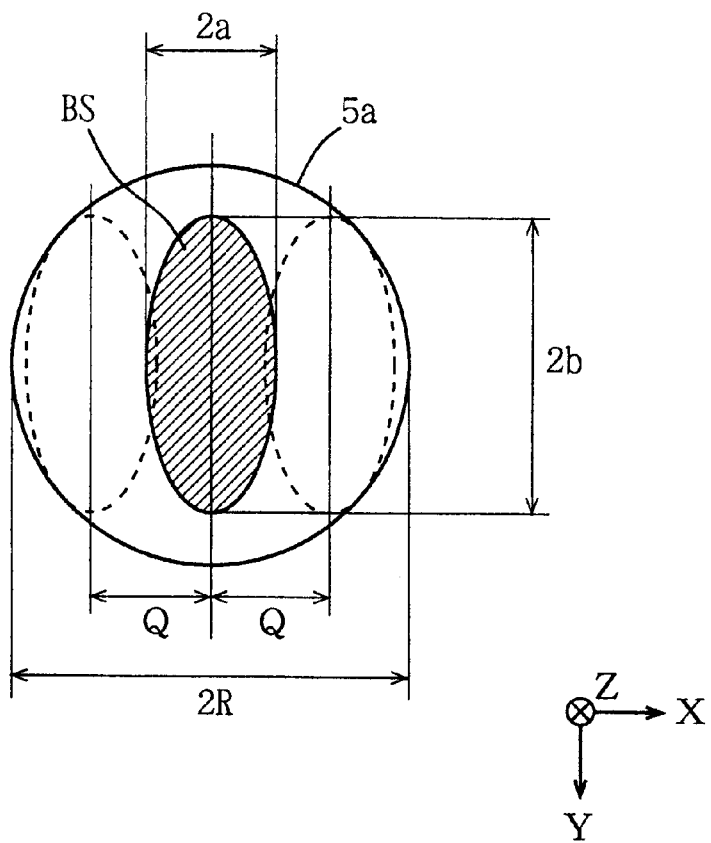
FIG. 6B is a plan view showing an incident state of diffracted beams on the objective lens.

(2) Elliptic Grating Surface 3a (a) In relation to an elliptic light spot coming into contact with the outer periphery of the lens aperture at two points on the objective lens plane FIG. 6A is a plan view of another diffraction grating 3 and FIG. 6B is a plan view showing an incident state of diffracted beams, diffracted by the diffraction grating 3 shown in FIG. 6A, on the objective lens 5.

Referring to FIG. 6A, a grating surface 3a of the diffraction grating 3 is formed in an elliptic shape having a minor axis WA and a major axis WB, with irregularities extending in the X-axis direction at regular pitches. The grating surface 3a is formed to be smaller than a light spot (not shown) formed on the diffraction grating surface 3a by the laser beam B emitted from the semiconductor laser device 2.

Diffracted beams diffracted by the grating surface 3a in the ±1st order directions form an elliptic light spot BS in the aperture 5a of the objective lens 5, as shown in FIG. 6B. The light spot BS has a minor axis 2a and a major axis 2b corresponding to the minor axis WA and the major axis WB of the grating surface 3a respectively.

The major axis 2b of the light spot BS is limited to be smaller than the diameter of the aperture 5a of the objective lens 5. Further, the amount Q of movement of the objective lens 5 in the direction X for the tracking operation is previously defined. Therefore, the minor axis WA of the grating surface 3a is so set that the light spot BS is not displaced beyond the aperture 5a of the objective lens 5 following movement by Q in the X direction for the tracking operation.

On the basis of this condition, the minor axis WA of the grating surface 3a is obtained in consideration of the geometric conditions of the optical system shown in FIG. 3.

Assuming that R and b represent the radius of the aperture 5a of the objective lens, 5 and that of the light spot BS along its major axis on the objective lens 5 respectively, the minor axis WA of the grating surface 3a is set by the following expression (14), within the range satisfying the condition of the following expression (13):

$$2 \times [L2/L1 \times \{\sqrt{R \times (R-Q)} - S\} + S] \leq WB < 2 \times [L2/L1 \times \{\sqrt{R^2 - Q^2} - S\} + S] \quad (13)$$

$$WA \leq 2 \times \{\sqrt{b^2 Q^2/(b^2 - R^2) + b^2}\} \times L2/L1 \quad (14)$$

where $$b = (WB - 2S) \times L1/L2 + 2S.$$

The variables L1, L2 and S in the expressions (13) and (14) are identical to those for the rectangular grating surface 3a.

Figure 7A:
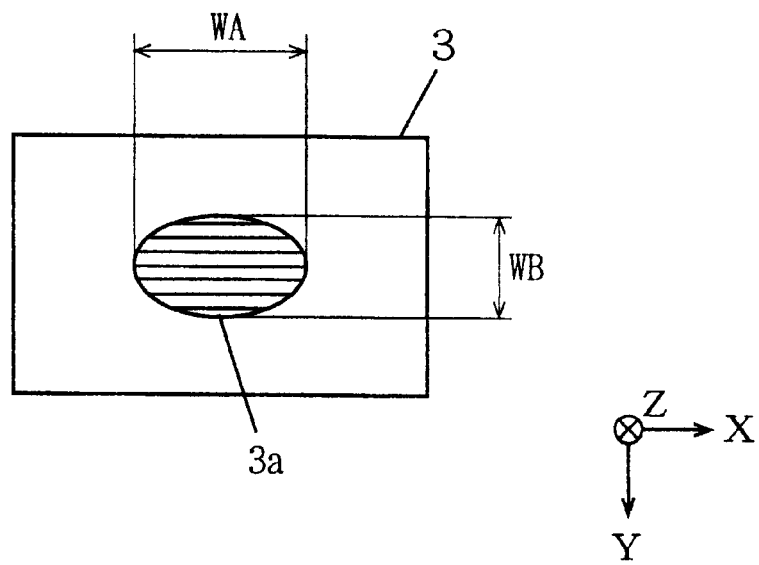
FIG. 7A is a plan view of still another diffraction grating.
Figure 7B:
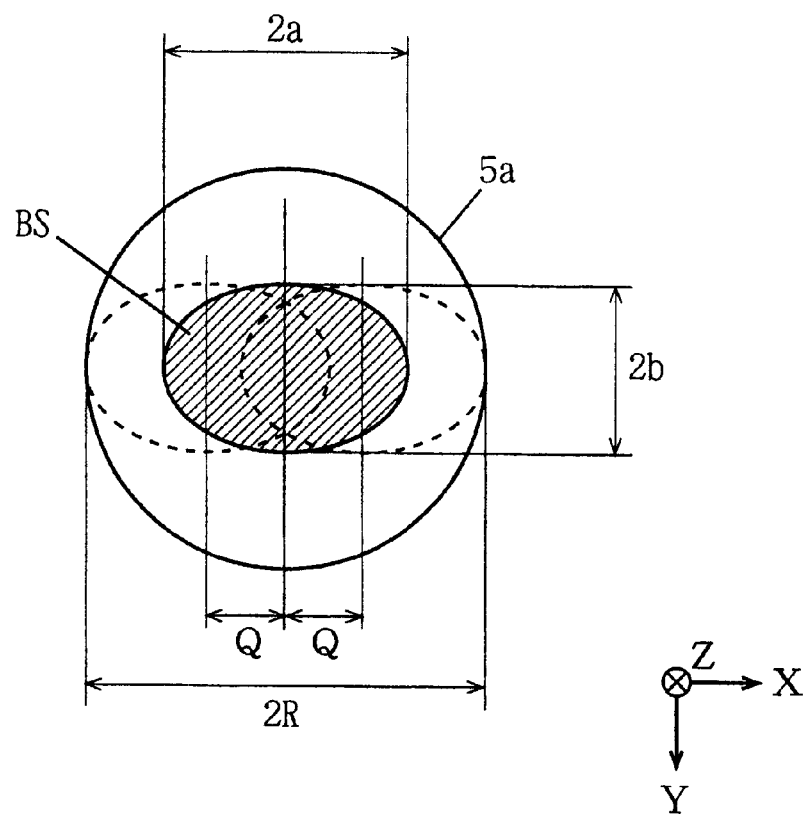
FIG. 7B is a plan view showing an incident state of diffracted beams on the objective lens.

(b) In relation to an elliptic light spot coming into contact with the outer periphery of the lens aperture at one point on the objective lens plane FIG. 7A is a plan view of still another diffraction grating 3, and FIG. 7B is a plan view showing an incident state of diffracted beams, diffracted by the diffraction grating 3 shown in FIG. 7A, on the objective lens 5.

Referring to FIG. 7A, a grating surface $3a$ of the diffraction grating 3 is formed in an elliptic shape having a major axis WA and a minor axis WB, with irregularities extending in the direction X at regular pitches. The grating surface $3a$ is formed to be smaller than a light spot (not shown) formed on the grating surface $3a$ by the laser beam B emitted from the semiconductor laser device 2.

The diffracted beams diffracted by the grating surface $3a$ in the ±1st order directions form an elliptic light spot BS in the aperture $5a$ of the objective lens 5, as shown in FIG. 7B. The light spot BS has a major axis $2a$ and a minor axis $2b$ corresponding to the major axis WA and the minor axis WB of the grating surface $3a$ respectively.

The minor axis $2b$ of the light spot BS is limited to be smaller than the diameter of the aperture $5a$ of the objective lens 5. Further, the amount Q of movement of the objective lens 5 in the direction X for the tracking operation is previously defined. Therefore, the major axis WA of the grating surface $3a$ is so set that the light spot BS is not displaced beyond the aperture $5a$ of the objective lens 5 following relative movement by Q in the X direction for the tracking operation.

On the basis of this condition, the major axis WA of the grating surface $3a$ is obtained in consideration of the geometric conditions of the optical system shown in FIG. 4.

Assuming that R represents the radius of the aperture $5a$ of the objective lens 5, the major axis WA of the grating surface $3a$ is set by the following expression (16), within the range satisfying the condition of the following expression (15):

$$WB < 2 \times [L2/L1 \times \{\sqrt{R \times (R-Q)} - S\} + S ] \quad (15)$$

$$WA \leq 2 \times (R-Q) \times L2/L1 \quad (16)$$

The variables L1, L2 and S in the expressions (15) and (16) are identical to those for the rectangular grating surface $3a$.

Thus, the grating surface $3a$ of the diffraction grating 3 is formed in the elliptic shape along the aforementioned conditions, so that the ±1st order diffracted beams are located in the aperture $5a$ of the objective lens 5 following movement of the objective lens 5 for the tracking operation and the subspots S1 and S2 can be prevented from change of the light quantities.

(c) A method of calculating the dimensions of the elliptic grating surface $3a$

The dimensions of the elliptic grating surface $3a$ shown in the above (a) or (b) are calculated in the following manner: Assuming that R, a and b represent the radius of the aperture $5a$ of the objective lens 5 and those of the light spot BS shown in FIG. 6B in the directions X and Y respectively, for example, a circle indicating the aperture $5a$ of the objective lens 5 is expressed as follows:

$$X^2 + Y^2 = R^2 \quad (17)$$

Each ellipse, shown by a dotted line, obtained by moving the light spot BS in the direction X by the amount Q of movement of the objective lens 5 is expressed as follows:

$$(X-Q)^2/a^2 + Y^2/b^2 = 1 \quad (18)$$

The intersection between the circle and the ellipse expressed in the above expressions (17) and (18) is obtained as the condition for preventing the light spot BS from displacement beyond the aperture $5a$ of the objective lens 5. In this case, the following expression (19) is obtained from the expressions (17) and (18):

$$(a^2-b^2)X^2 + 2b^2QX + a^2b^2 - b^2Q^2 - a^2R^2 = 0 \quad (19)$$

In order to bring the circle and the ellipse expressed in the expressions (17) and (18) into contact with each other as shown in FIG. 6B or 7B, the expression (19) must be transformed into:

$$(CX-K)^2 = 0 \quad (20)$$

Hence, the following relations are deduced:

$$a^2 - b^2 = C^2 \quad (21)$$

$$2b^2Q = -2CK \quad (22)$$

$$a^2b^2 - b^2Q^2 - a^2R^2 = K^2 \quad (23)$$

The expression (22) results in $b^4Q^2 = C^2K^2$, which is substituted in the expressions (21) and (23) to obtain:

$$a^2\{a^2(b^2-R^2) - b^2Q^2 - b^2(b^2-R^2)\} = 0 \quad (24)$$

where a>0, to result in:

$$a^2(b^2-R^2) - b^2Q^2 - b^2(b^2-R^2) = 0 \quad (25)$$

Thus, the following relation holds:

$$a^2 = b^2Q^2/(b^2-R^2) + b^2$$

$$a = \sqrt{(b^2Q^2/(b^2-R^2) + b^2)} \quad (26)$$

where (26)>0, to result in:

$$b < \sqrt{R^2-Q^2} \quad (27)$$

As to the condition for bringing the aperture $5a$ of the objective lens 5 and the light spot BS into contact with each other on the boundary between the states shown in FIGS. 6B and 7B following movement of the objective lens, the expression (27) is transformed as follows, with the relation a=R−Q:

$$b^2 - R(R-Q) = 0 \quad (28)$$

Thus, the following condition is obtained:

$$b = \sqrt{R(R-Q)} \quad (29)$$

When the light spot BS comes into contact with the aperture $5a$ of the objective lens 5 in the state shown in FIG. 6B, i.e., $$\sqrt{R(R-Q)} \leq b < \sqrt{R^2-Q^2} \quad (30)$$

the light spot BS formed on the objective lens 5 is not displaced beyond the aperture $5a$ under the following condition:

$$a \leq \sqrt{b^2Q^2/(b^2-R^2) + b^2} \quad (31)$$

When the light spot BS comes into contact with the aperture $5a$ of the objective lens 5 in the state shown in FIG. 7B, i.e., $$b < \sqrt{R(R-Q)} \quad (32)$$

the light spot BS is not displaced beyond the aperture 5a under the following condition:

$$a \leq R-Q \qquad (33)$$

Under the conditions of the above expressions (30) to (33) and in consideration of the geometric conditions of the optical system shown in FIGS. 3 and 4, the dimensions a and b on the objective lens 5 are transformed into the vertical and transverse dimensions WA and WB of the grating surface 3a, to obtain the relations of the above expressions (13) to (16).

The grating surface 3a is not restricted to the aforementioned rectangular or elliptic shape, but can be formed in any shape such as a circle, a combination of a circle and a rectangle, or a combination of a semi-ellipse and a rectangle, for example. Limit conditions similar to the above can be applied to such a shape, for setting the dimensions. Particularly in case of a circle, the outer dimensions can be obtained by applying the above expressions (13) to (16).

(2) Second Embodiment

Figure 8:
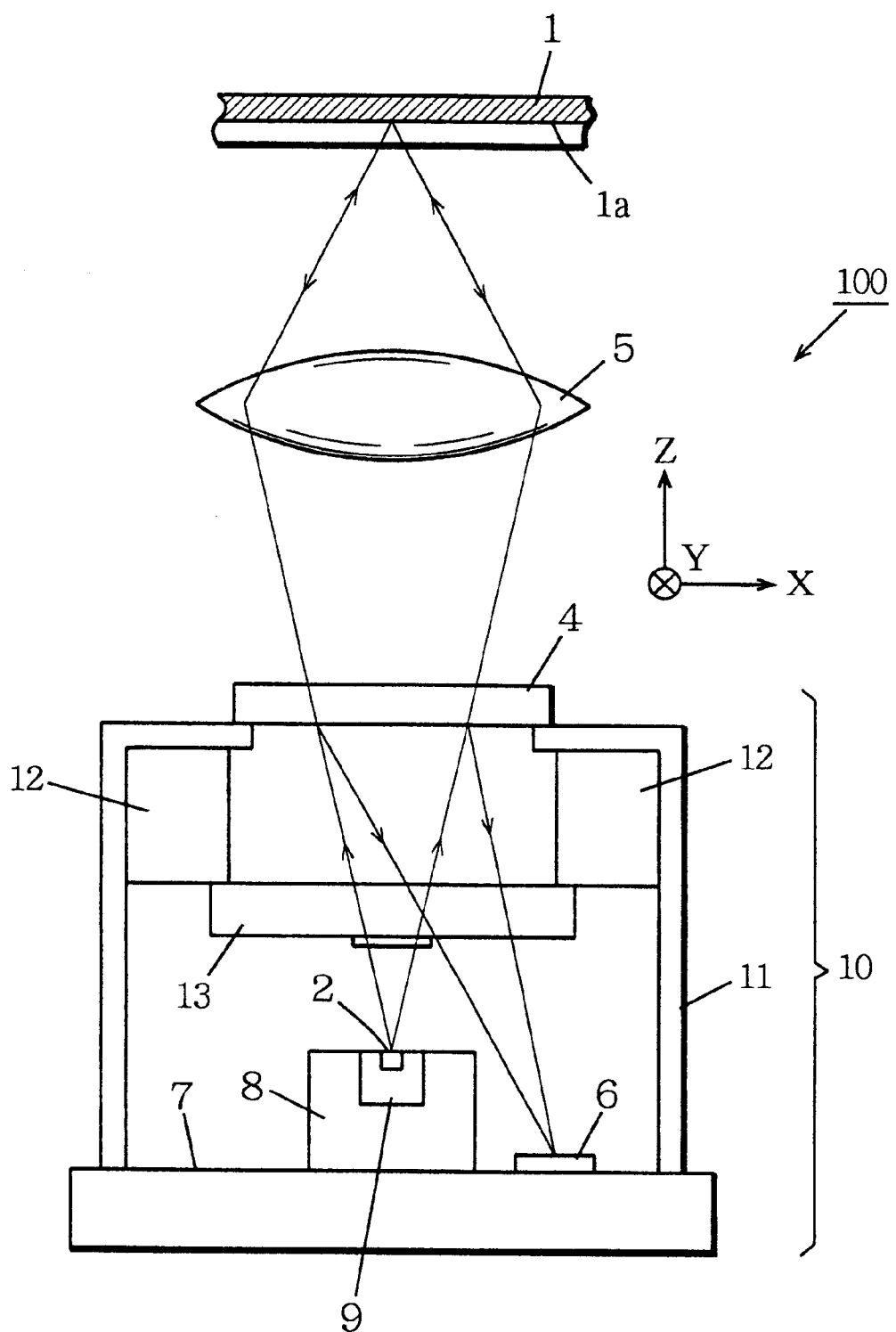
FIG. 8 is a schematic block diagram showing an optical pickup apparatus according to a second embodiment of the present invention.

An optical pickup apparatus 100 shown in FIG. 8 is adapted to perform focus servo control with the astigmatism method and tracking servo control with the three-beam method.

Referring to FIG. 8, symbols X, Y and Z denote the radial direction of a reflection type optical disk 1 such as a CD (compact disk), the track direction of the optical disk 1 and a direction perpendicular to a recording plane 1a of the optical disk 1 respectively.

The optical pickup apparatus 100 comprises a projecting/photoreceiving unit 10 and an objective lens 5. The projecting/photoreceiving unit 10 is formed by a semiconductor laser device 2, a transmission-type diffraction grating 13, a transmission-type holographic optical element 4 and a photodetector 6.

A block 8 is provided on a base 7, and a heat sink 9 is mounted on a side surface of the block 8. The semiconductor laser device 2 is mounted on a surface end of the heat sink 9.

The diffraction grating 13 is made of optical glass or optical resin, and arranged in a holder 11 through a spacer 12. The transmission-type holographic optical element 4 is arranged in an opening on an upper surface of the holder 11.

The semiconductor laser device 2 emits a laser beam in the direction Z. The diffraction grating 13 divides the beam emitted from the semiconductor laser device 2 into three beams, i.e., a 0th order diffracted beam (main beam), a +1st order diffracted beam (subbeam) and a −1st order diffracted beam (subbeam) in a plane substantially including the directions Y and Z, and transmits the same through the transmission-type holographic optical element 4. FIG. 8 shows the three beams as a single beam.

The objective lens 5 is supported to be movable in the radial direction (the direction X) of the optical disk 1 for tracking servo control, and to be movable in the vertical direction (the direction Z) for focus servo control. The objective lens 5 condenses the main beam and the two subbeams diffracted and transmitted through the transmission-type holographic optical element 4 in the 0th and ±1st orders respectively on the optical disk 1 as a main spot M0 and subspots S1 and S2 positioned on both sides thereof respectively (see FIG. 22).

The transmission-type holographic optical element 4 diffracts three returned beams (reflected beams) from the optical disk 1 in a plane substantially including the directions X and Z in the 1st order and introduces the same into the photodetector 6. At this time, the transmission-type holographic optical element 4 supplies the three returned beams from the optical disk 1 with astigmatism respectively.

The photodetector 6, which is similar in structure to the photodetector 106 of the conventional optical pickup apparatus 100 shown in FIG. 23, outputs an information reproduction signal and a focus signal on the basis of the returned beam from the main spot M0 on the optical disk 1 while outputting a tracking error signal TE on the basis of the returned beams from the subspots S1 and S2.

Figure 9:
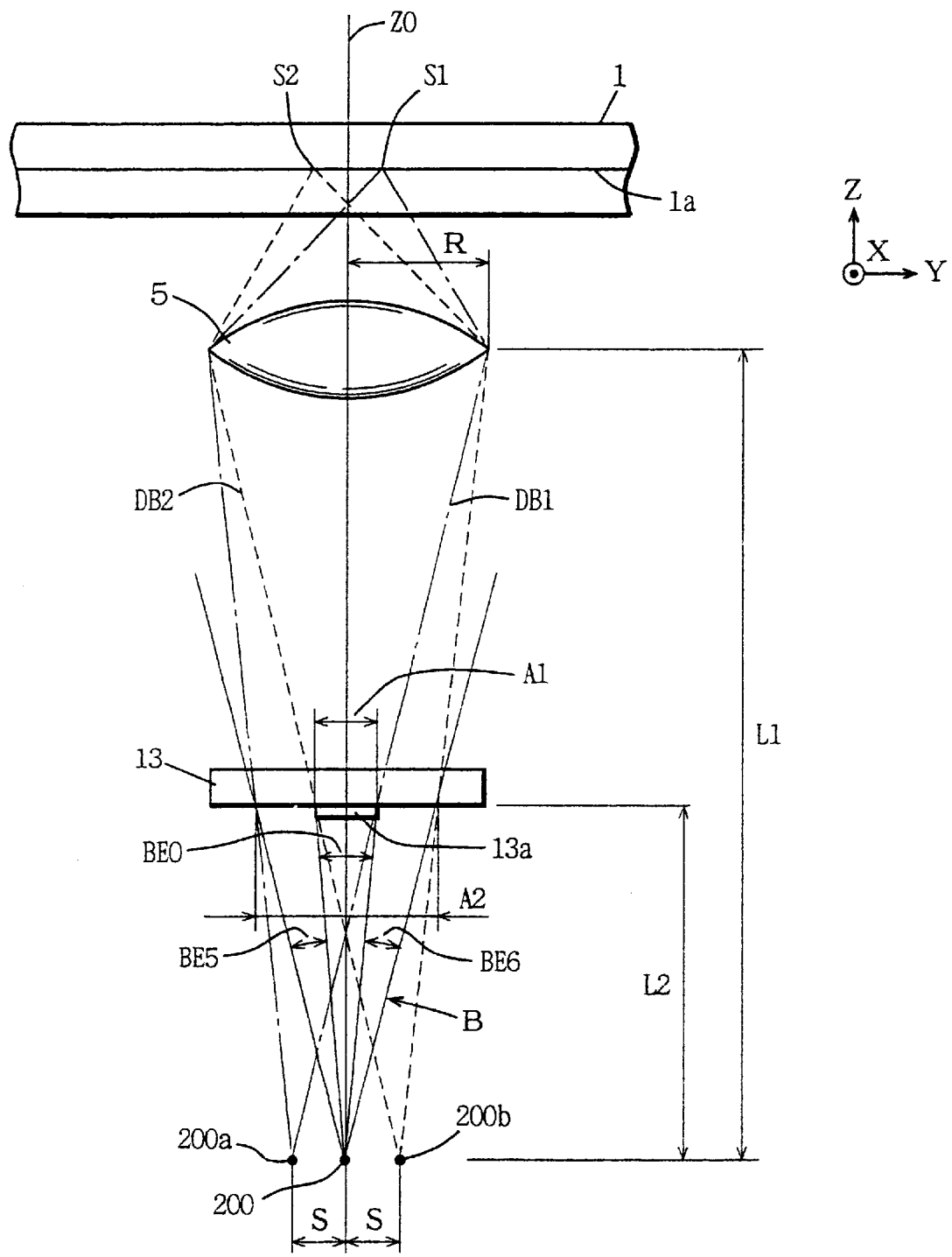
FIG. 9 is a model diagram showing an optical disk irradiated with a laser beam.
Figure 10:
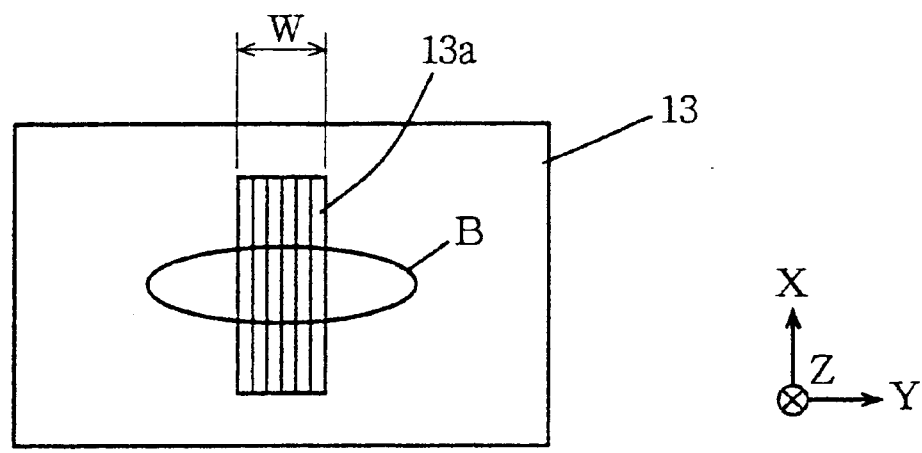
FIG. 10 is a plan view showing an incident state of the laser beam on the diffraction grating.

FIG. 9 is a model diagram showing the optical disk 1 irradiated with the laser beam B. FIG. 10 is a plan view of the diffraction grating 13 receiving the laser beam B. A method of setting the width W (the width in the direction Y) of a grating surface 13a of the diffraction grating 13 is now described.

Figure 21:
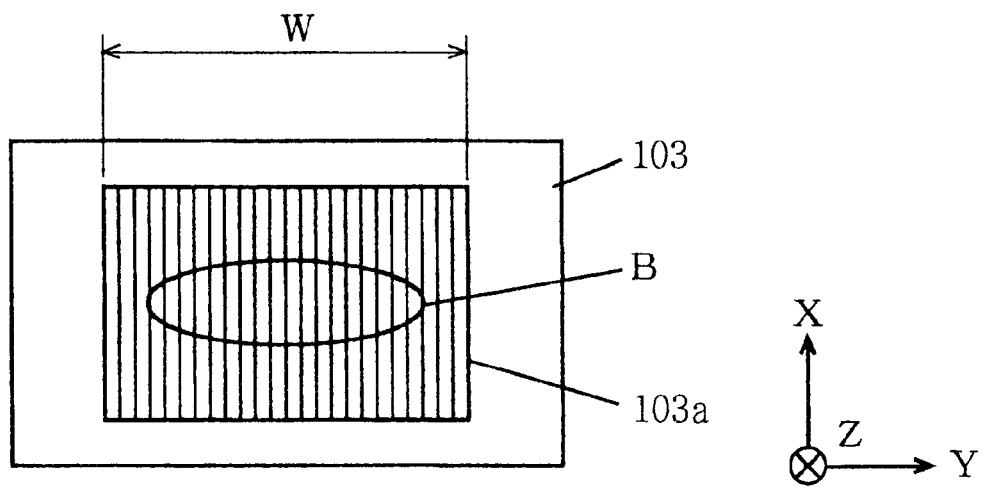
FIG. 21 is a plan view of a diffraction grating of the conventional optical pickup apparatus.
Figure 24A:
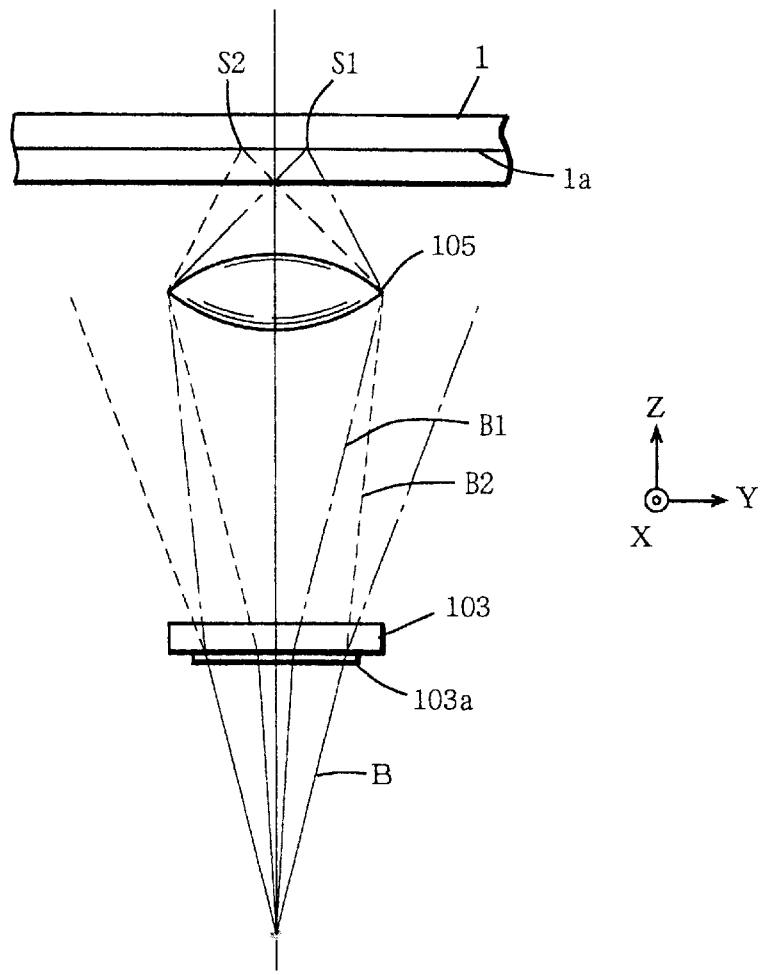
FIG. 24A is a typical sectional view showing states of diffracted beams.
Figure 24B:
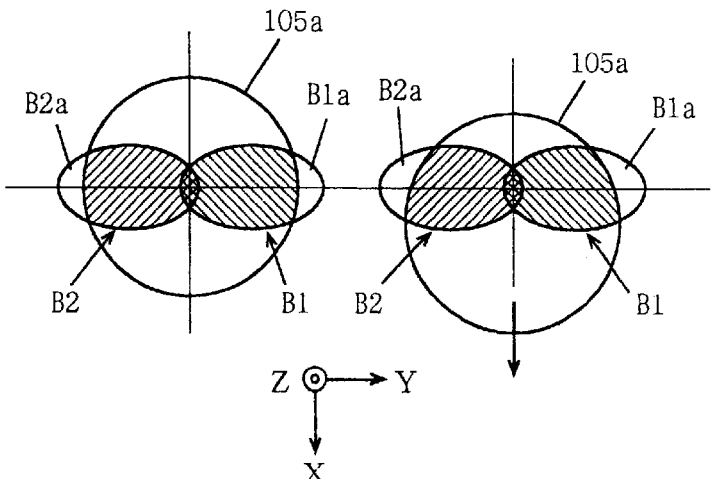
FIG. 24B is a typical plan view showing the incident states of the diffracted beams to an objective lens.
Figure 25:
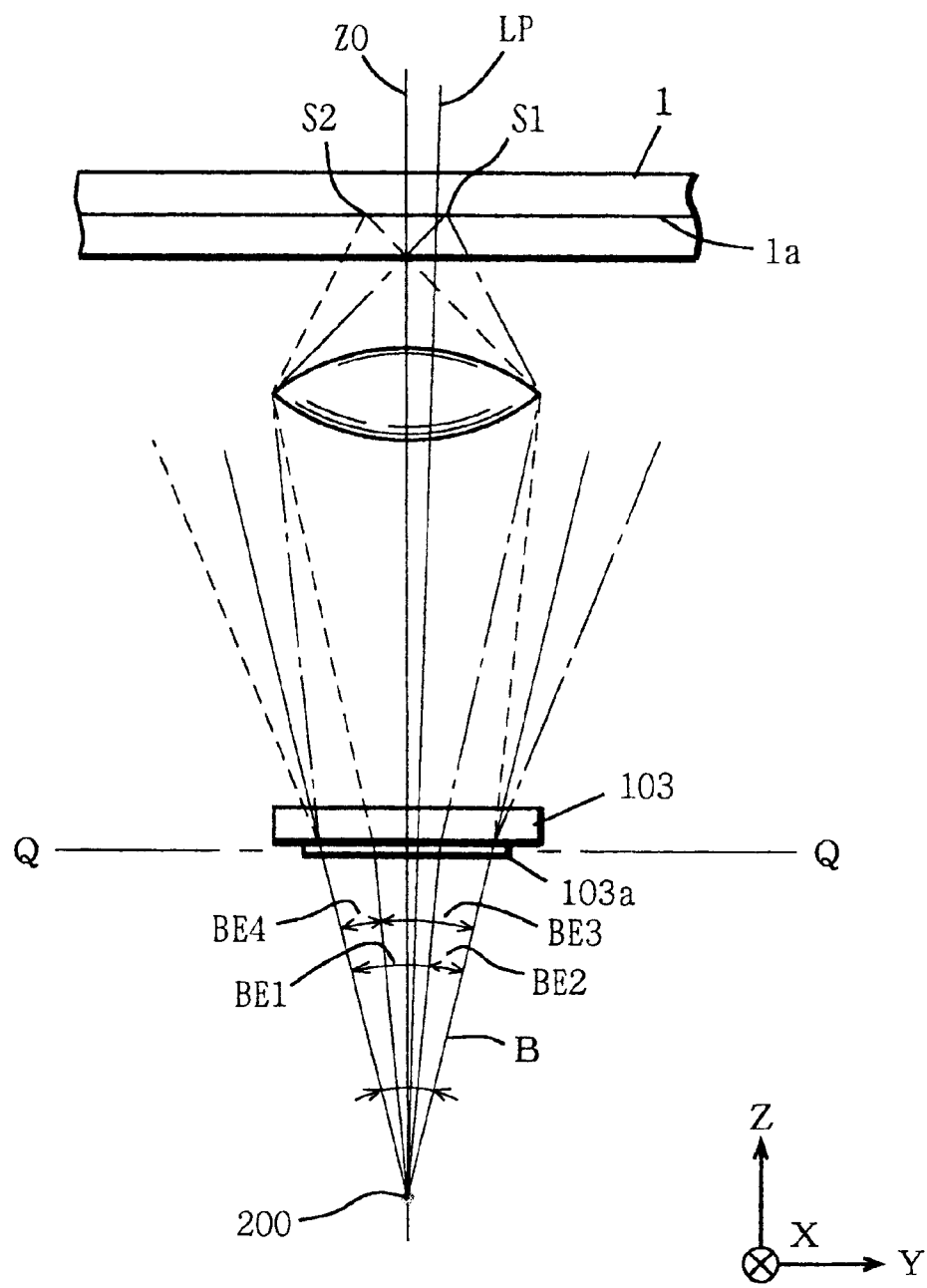
FIG. 25 is a schematic block diagram of the conventional optical pickup apparatus.

As shown in FIGS. 21 and 24A, the diffraction grating 103 of the conventional optical pickup apparatus 100 is provided with the grating surface 103a which is larger in width than the laser beam B. having an elliptic sectional shape, along the major axis direction. When the optical axis LP of the laser beam B deviates from the central axis Z0 of the objective lens 105, therefore, the light quantities of the two subspots S1 and S2 formed on the optical disk 1 are dispersed to disadvantageously offset the tracking error signal TE.

In the diffraction grating 13 according to this embodiment, the width W of the grating surface 13a is so adjusted as to cause no dispersion of light quantities in the two subspots S1 and S2 condensed on the optical disk 1 even if the optical axis LP of the laser beam B deviates from the central axis Z0 in the direction perpendicular to the radial direction of the optical disk 1.

Referring to FIG. 9, the laser beam B emitted from the a light source 200 (the semiconductor laser device 2) includes a partial beam BE0 which is common to a +1st order diffracted beam DB1 and a −1st order diffracted beam DB2 diffracted by the grating surface 13a to enter the objective lens 5, and the width W of the grating surface 13a is set to be equal to or smaller than the width A1 of a light spot formed by the common partial beam BE0 on the diffraction grating 13.

Figure 26A:
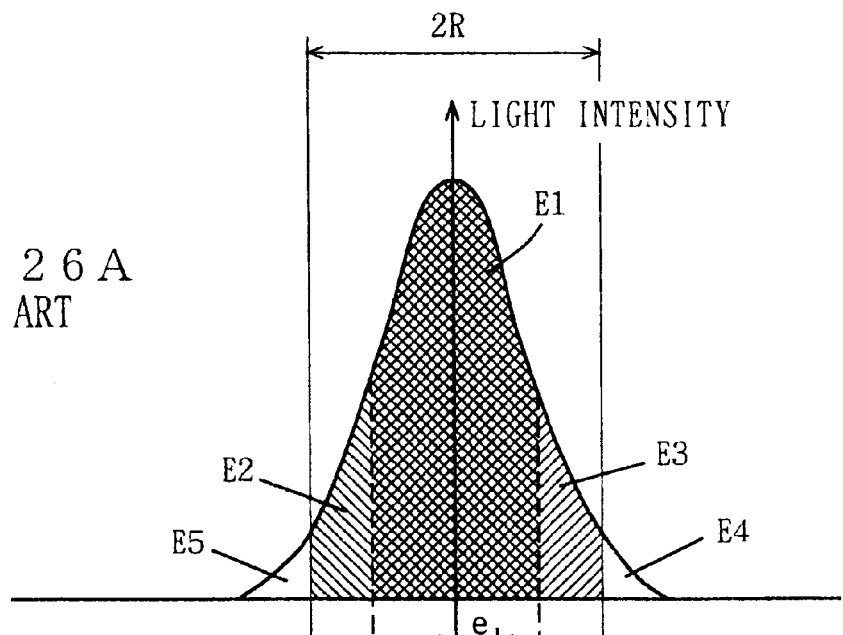
FIGS. 26A and 26B are explanatory diagrams showing light intensity distribution states of a laser beam.
Figure 26B:
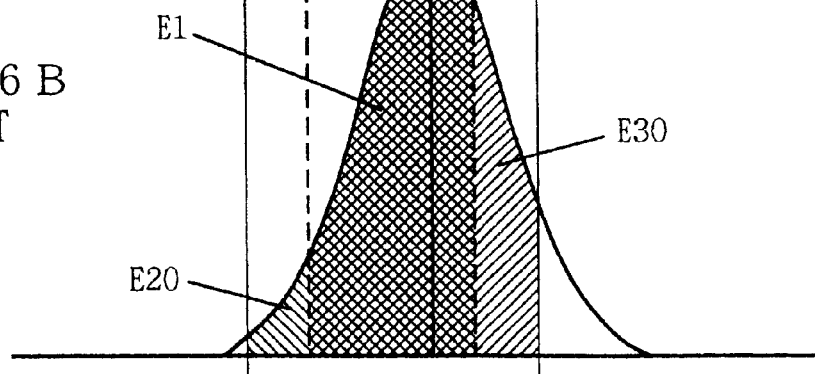
Figure 27:
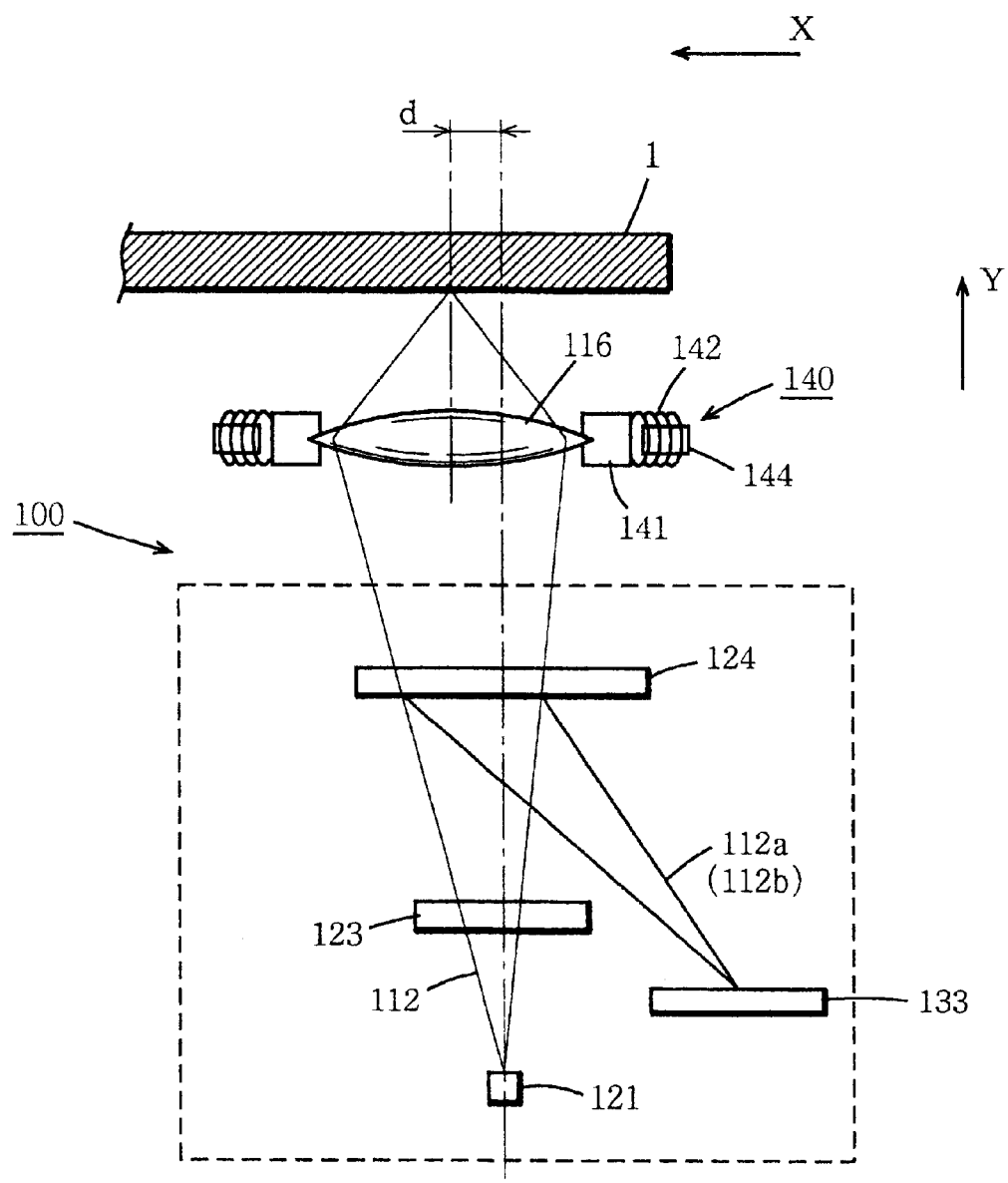
FIG. 27 is a model diagram showing the structure of another conventional optical pickup apparatus.
Figure 28:
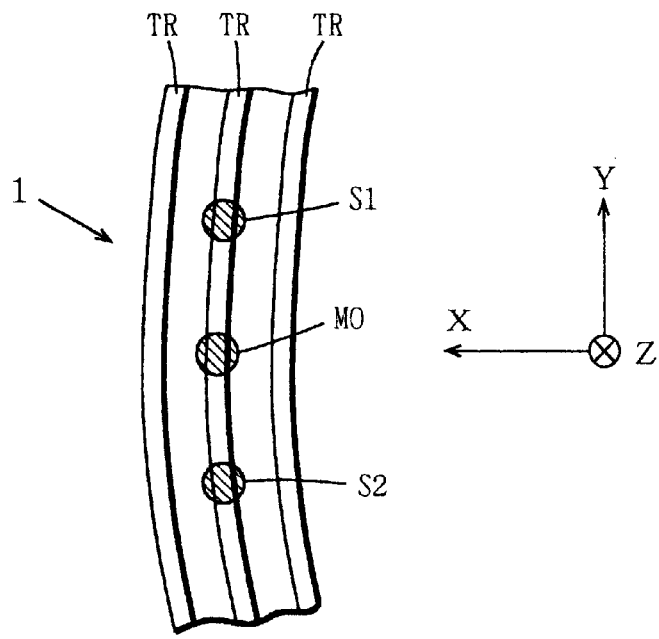
FIG. 28 is a model plan view showing condensed states on an optical disk.
Figure 29:
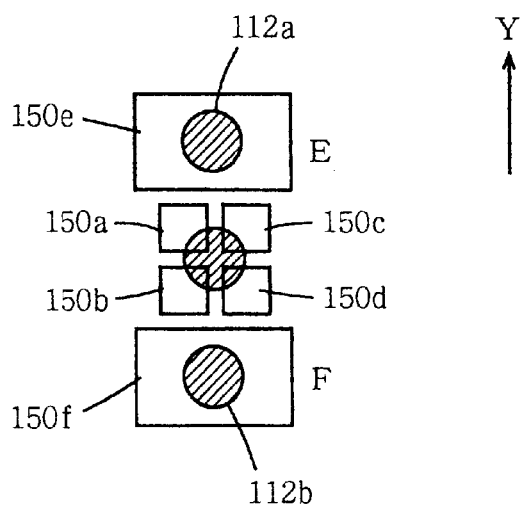
FIG. 29 is a plan view of a signal detection photodiode.
Figure 30:
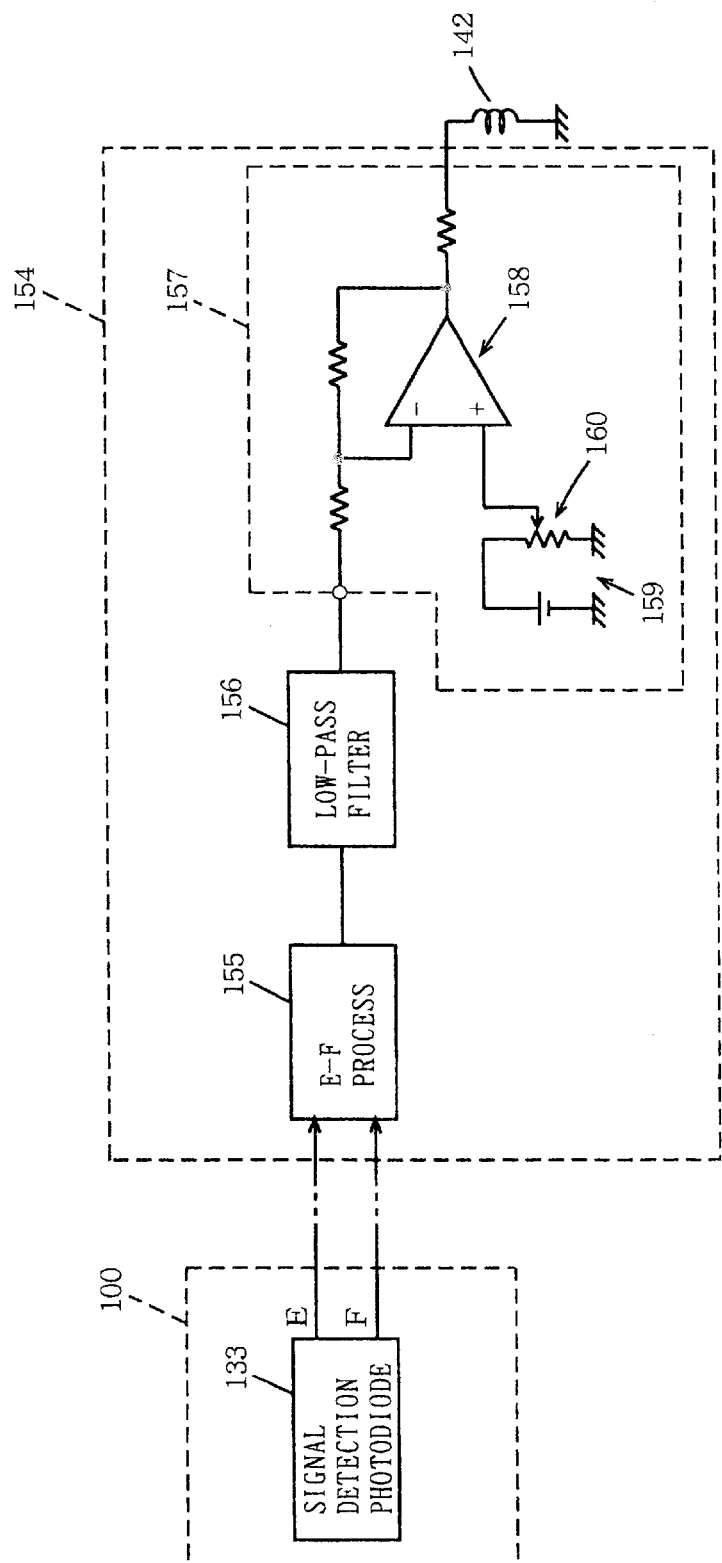
FIG. 30 is a circuit diagram of respective parts, performing a tracking operation, of an optical disk drive comprising the conventional optical pickup device.
Figure 31:
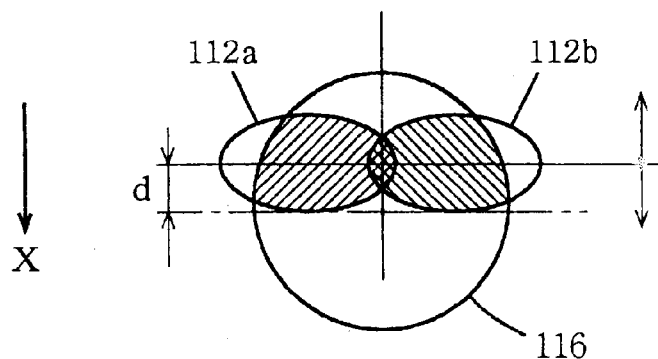
FIG. 31 is a typical plan view showing an incident state of a laser beam on an objective lens.

The partial beam BE0 is common to the +1st order diffracted beam DB1 and the −1st order diffracted beam DB2. Even if the optical axis LP of the laser beam B deviates to move the light intensity peak position as shown in FIG. 26B, therefore, the +1st diffracted beam DB1 and the −1st diffracted beam DB2 change in the same light intensity. Thus, the light quantities of the two subspots S1 and S2 condensed on the optical disk 1 also equally change. Consequently, offset of the tracking error signal TE can be prevented.

Assuming that R represents the aperture radius of the objective lens 5, S represents the distance between the effective positions of a virtual light source 200a for the +1st order diffracted beam DB1 and the light source 200, and L1 and L2 represent effective distances between the center of the objective lens 5 and the effective position of the light source 200 and between the diffraction surface of the diffraction grating 13 and the effective position of the light source 200 respectively in FIG. 9, the width A1 of a light spot formed by the partial beam BE0 incident on the diffraction grating 13 is obtained through the following expression (41):

$$A1=2\times\{(R+S)\times L2/L1-S\} \qquad (41):$$

Hence, the width W of the grating surface 13a of the diffraction grating 13 is set to satisfy:

$$W \leq 2\times\{(R+S)\times L2/L1-S\}$$

Figure 11:
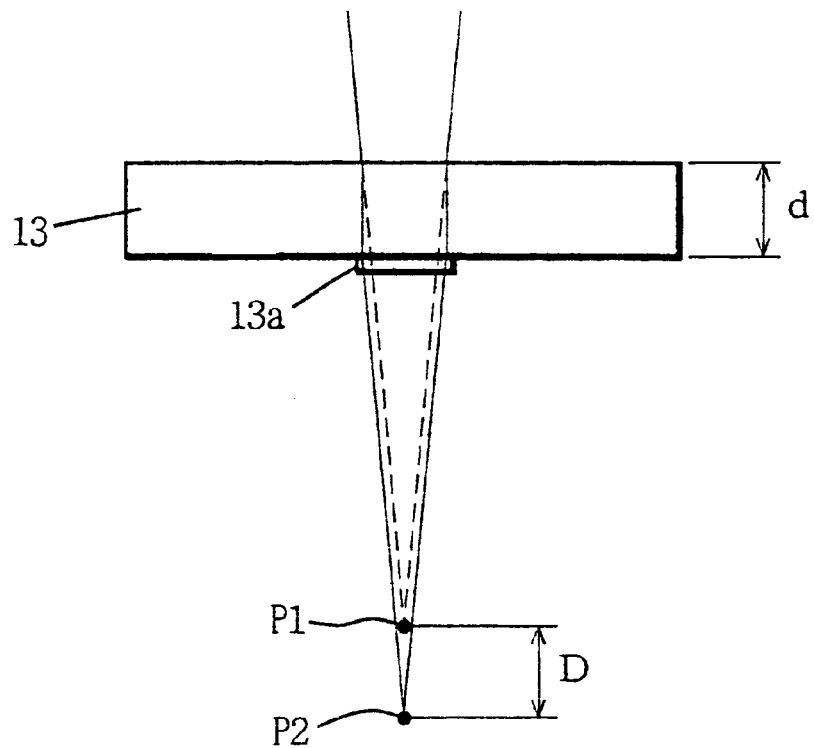
FIG. 11 is an explanatory diagram showing the relation between effective and actual positions of a light source.

The effective position of the light source 200 is that in case of neglecting influence by the refractive index of the diffraction grating 13, and FIG. 11 shows the relation between the effective position and the actual position of the light source 200 (the emissive end of the semiconductor laser device 2). Assuming that n and d represent the refractive index and the thickness of the diffraction grating 13 in FIG. 11 respectively, the distance D between the effective position P1 and the actual position P2 of the light source 200 is obtained as follows:

$$D=(n-1) \times d/n \quad (42)$$

Hence, the following relation holds between the effective distance L1 between the center of the objective lens 5 and the light source 200 and the physical distance X1 between the center of the objective lens 5 and the actual position P2 of the light source 200:

$$L1=X1-D=X1-(n-1)\times d/n$$

Further, the following relation holds between the effective distance L2 between the grating surface 13a of the diffraction grating 13 and the effective position P1 of the light source 200 and the physical distance X2 between the grating surface 13a of the diffraction grating 13 and the actual position P2 of the light source 200:

$$L232\ X2-D=X2-(n-1)\times d/n$$

The virtual light sources 200a and 200b are supposed to emit the same beams as the ±1st order diffracted beams DB1 and DB2 respectively when no diffraction grating 13 is provided.

The distance S between the effective position of the light source 200 and those of the virtual light sources 200a and 200b for the ±1st order diffracted beams DB1 and DB2 in the expression (41) is obtained in the following manner: Assuming that λ and Λ represent the wavelength of the laser beam B and the grating cycle of the grating surface 13a of the diffraction grating 13 respectively, L2 represents the effective distance between the effective position of the light source 200 and a surface of the diffraction grating 13 closer to the light source 200 and d and n represent the thickness and the refractive index of a substrate for the diffraction grating 13 respectively, the distance S is obtained in the following expression (43) or (44) when the grating surface 13a is provided on a surface of the diffraction grating 13 closer to the light source 200 or the objective lens 5:

$$S=\{L2+(n-1)\times d/n\} \times \tan\{\sin^{-1}(\lambda/\Lambda)\} \quad (43)$$

$$S=(L2+d) \times \tan\{\sin^{-1}(\lambda/\Lambda)\} \quad (44)$$

Referring to FIG. 9, the width W of the grating surface 13a of the diffraction grating 13 may be smaller than the width A2 of a light spot formed by the laser beam B on an incidence plane on the diffraction grating 13. The width A2 of the light spot, including a light spot (first light spot) on the diffraction grating 13 corresponding to a part of the +1st order diffracted beam DB1, diffracted by the diffraction grating 31, entering the objective lens 5 and a light spot (second light spot) on the diffraction grating 13 corresponding to a part of the −1st order diffracted beam DB2, diffracted by the diffraction grating 13, entering the objective lens 5, is referred to as an effective beam diameter.

In this case, a partial beam BE5 contributing to the +1st order diffracted beam DB1 and a partial beam BE6 contributing only to the −1st order diffracted beam DB2 further enter the grating surface 13a in the laser beam B. However, the width W of the grating surface 13a is rendered smaller than the width A2 of the light spot formed by the laser beam B, thereby reducing the incident quantities of the partial beams BE5 and BE6. Therefore, the ratio of the partial beams BE5 and BE6 changing the light quantities due to optical axis deviation of the laser beam B reduces with respect to the partial beam BE0 not influenced by the optical axis deviation. Thus, the quantity of offset of the tracking error signal TE resulting from optical axis deviation can be reduced as compared with the conventional diffraction grating 103.

The width A2 of the light spot formed by the laser beam B is obtained as follows:

$$A2=2\times\{(R-S)\times L2/L1+S\} \quad (45)$$

In this case, therefore, the width W of the grating surface 13a is set to satisfy the following relation:

$$W<A2$$

The variables in the expression (45) are similar to those in the above expressions (41) to (44).

The diffraction grating 13 of this embodiment is applicable not only to the optical pickup apparatus 100 shown in FIG. 8 vertically emitting the laser beam B, but also to an optical pickup apparatus horizontally emitting a laser beam and vertically guiding the same with a reflecting mirror.

In the aforementioned second embodiment, the limit value for the width W of the grating surface 13a of the diffraction grating 13 is obtained for suppressing offset of the tracking error signal TE resulting from deviation of the optical axis of the laser beam B and the central axis of the objective lens 5 in the direction perpendicular to the radial direction of the optical disk 1, i.e., in the direction Y. Thus, the dimensions of the grating surface 13a obtained in the first embodiment can be further set while satisfying the limit condition for the width W thereof. When the grating surface 3a (13a) has a rectangular shape, for example, the dimension of the grating surface 3a (13a) in the direction (the direction Y) perpendicular to the radial direction of the optical disk 1 is set to satisfy the limitation of the expression (45), preferably the expression (41) in the second embodiment, and the limitation of the expression (9) in the first embodiment, and that in the radial direction (the direction X) of the optical disk 1 is set to satisfy the limitation of the expression (5) in the first embodiment. Thus, it is possible to suppress offset of the tracking error signal TE resulting from deviation of the optical axis of the laser beam B and the central axis of the objective lens 5, while preventing output reduction of the tracking error signal TE in the tracking operation. A similar effect can be attained also in relation to an elliptic or circular grating surface.

(3) Third Embodiment

Figure 12:
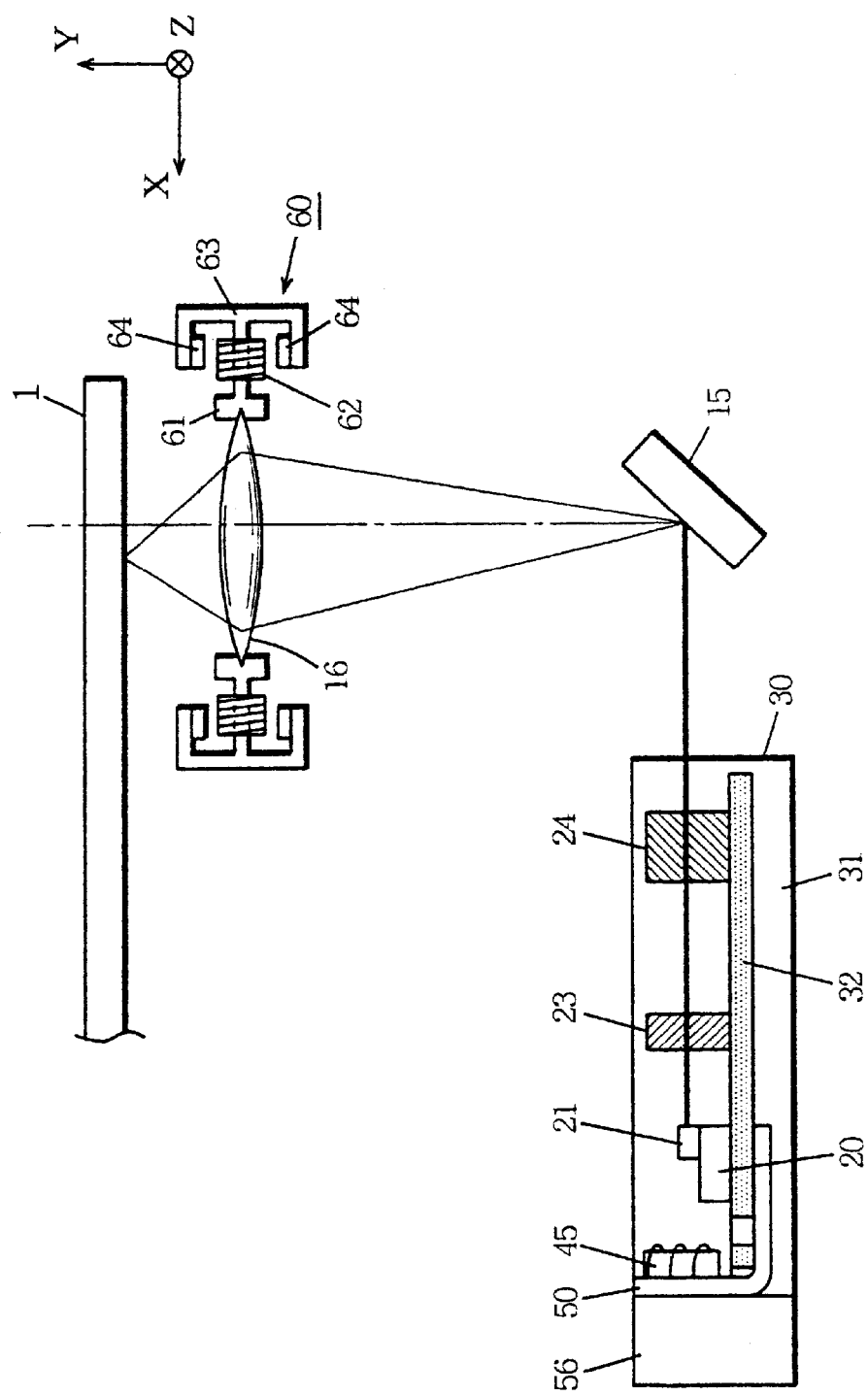
FIG. 12 is a side sectional view showing the structure of an optical pickup apparatus according to a third embodiment of the present invention.
Figure 13:
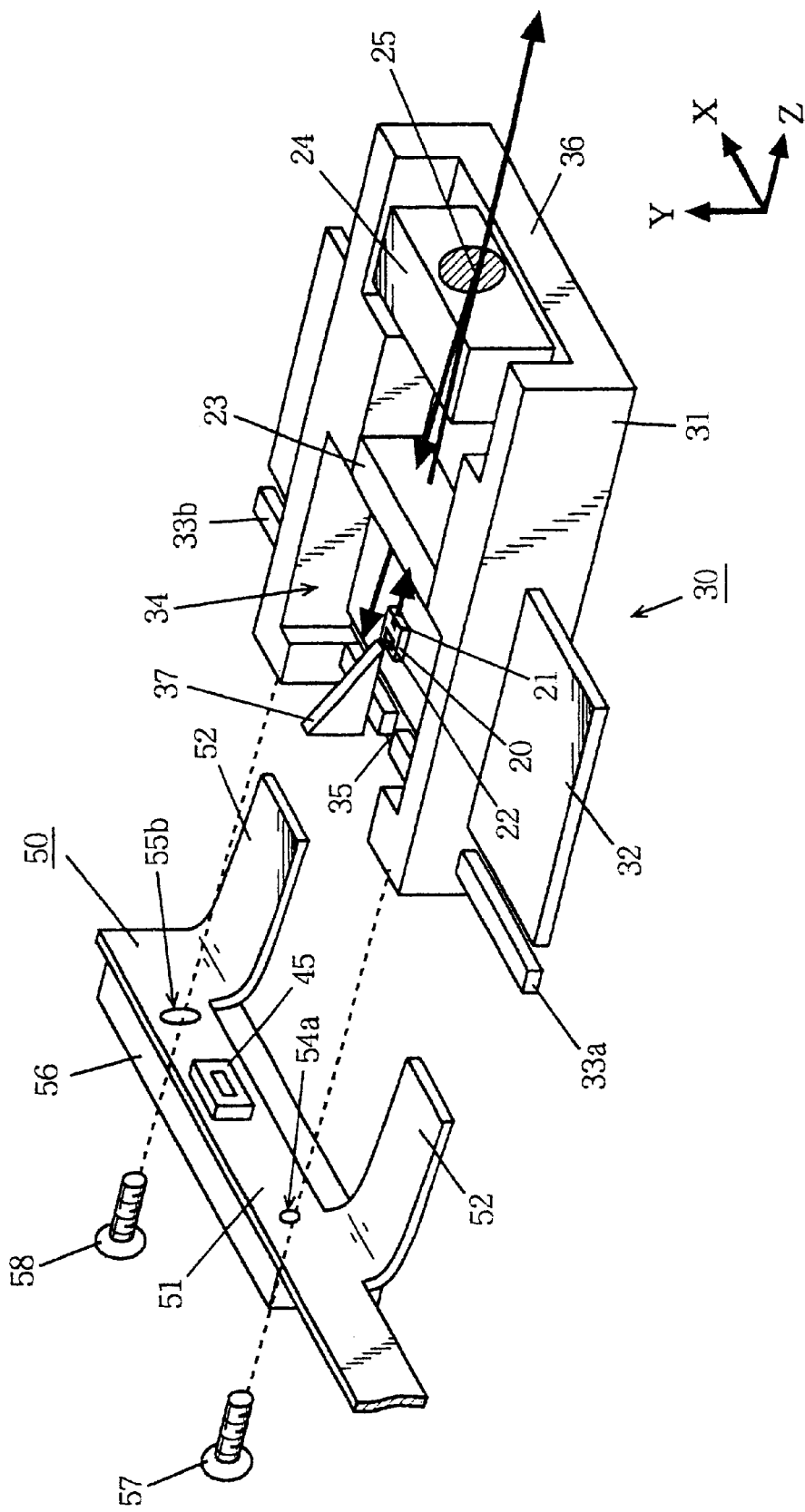
FIG. 13 is an exploded perspective view of a projecting/photoreceiving unit of the optical pickup apparatus shown in FIG. 12.

FIG. 12 is a side elevational view showing the structure of an optical pickup apparatus according to a third embodiment of the present invention, and FIG. 13 is an exploded perspective view of a projecting/photoreceiving unit provided in the optical pickup apparatus shown in FIG. 12. Referring to FIGS. 12 and 13, symbols X, Y and Z denote the radial direction of an optical disk 1, a direction perpendicular to a recording plane of the optical disk 1, and a direction perpendicular to the X-Y plane. FIG. 12 shows the projecting/photoreceiving unit in a state rotated by 90° about the Y axis, for the convenience of illustration.

Referring to FIGS. 12 and 13, the optical pickup apparatus is formed by integrally assembling the projecting/ photoreceiving unit including a semiconductor laser device 21, a diffraction grating 23 and a transmission-type holographic optical element 24 into a housing (not shown) including an objective lens 16.

The projecting/photoreceiving unit comprises a support member 30. The support member 30 is formed by integrating a lead frame 32 with a pair of leads 33a and 33b by an insulating molded body 31 which is made of resin. The insulating molded body 31 is provided on its upper surface with a concave part 34 opening between first and second end surfaces 35 and 36 for exposing surfaces of the lead frame 32 and the leads 33a and 33b.

A conductive submount (heat sink) 20 is mounted on the surface of the lead frame 32 exposed in the concave part 34 of the insulating molded body 31 at a portion closer to the first end surface 35, to be electrically connected with the lead frame 32. A monitor photodiode 22 is formed on a part of the upper surface of the conductive submount 20. The semiconductor laser device 21 is mounted on the upper surface of the submount 20 in front of the monitor photodiode 22. The semiconductor laser device 21 emits laser beams from its front and rear end surfaces respectively. so that the monitor photodiode 22 receives the laser beam emitted from the rear end surface as a monitor beam.

The diffraction grating 23 is arranged in the concave part 34 of the insulating molded body 31 on the central portion of the lead frame 32. A grating surface of the diffraction grating 32 divides the laser beam emitted from the front end surface of the semiconductor laser device 21 into 0th, +1st and −1st order diffracted beams.

In the concave part 34 of the insulating molded body 31, the transmission-type holographic optical element 24 is arranged on the surface of the lead frame 32 in a portion closer to the second end surface 36. A holographic surface 25 of the transmission-type holographic optical element 24 transmits the 0th, +1st and −1st order diffracted beams from the diffraction grating 23, and diffracts returned beams from an optical recording medium 1 such as an optical disk. In the concave part 34 of the insulating molded body 31, further, a stray light screen 37 is arranged on the lead frame 32 for shielding the beam emitted from the semiconductor laser device 21 and the returned beams from the diffraction grating 23 against each other.

A flexible circuit board 50 is mounted on the first end surface 35 of the insulating molded body 31. The flexible circuit board 50, which is formed by a polyimide resin plate provided with a conductive wiring pattern on its surface, has a wiring part 51 and fixing parts 52. A photodiode integrated circuit device (hereinafter referred to as a PDIC) 45 for signal detection serving as a photodetector is mounted on a surface (provided with the wiring pattern) of the wiring part 51 of the flexible circuit board 50. Circular and elliptic screw through holes 54a and 55b are formed in the wiring part 51 of the flexible circuit board 50 on both sides of the PDIC 45. Further, a keep plate 56 is mounted on the rear surface of the flexible circuit board 50.

Surfaces of the fixing parts 52 of the flexible circuit board 50 are fixed to lower surfaces of the pair of leads 33a and 33b and the lead frame 32 by soldering or the like. The wiring part 51 of the flexible circuit board 50 is bent upward, to be perpendicular to the upper surface of the lead frame 32. In this state, screws 57 and 58 are fitted into screw holes (not shown) through the screw through holes 54a and 55b, for mounting the wiring part 51 on the first end surface 35 of the insulating molded body 31.

A reflecting mirror 15, an objective lens 16 and an actuator 60 are mounted on the housing. The reflecting mirror 15 vertically reflects the three diffracted beams transmitted through the transmission-type holographic optical element 24 upward, while horizontally reflecting the returned beams from the optical disk 1 and guiding the same to the transmission-type holographic optical element 24.

The objective lens 16 condenses the three diffracted beams reflected by the reflecting mirror 15 on the optical disk 1 for forming a main spot and two subspots positioned on both sides thereof.

The actuator 60 has a holder 61, a tracking coil 62, a yoke 63 and permanent magnets 64. When supplied with a driving signal (tracking error signal), the tracking coil 62 receives electromagnetic force caused between the permanent magnets 64 mounted on the fixed yoke 63 and the tracking coil 62 for moving the objective lens 16 in the radial direction (the X-axis direction) of the optical disk 1 through the holder 61.

Figure 14:
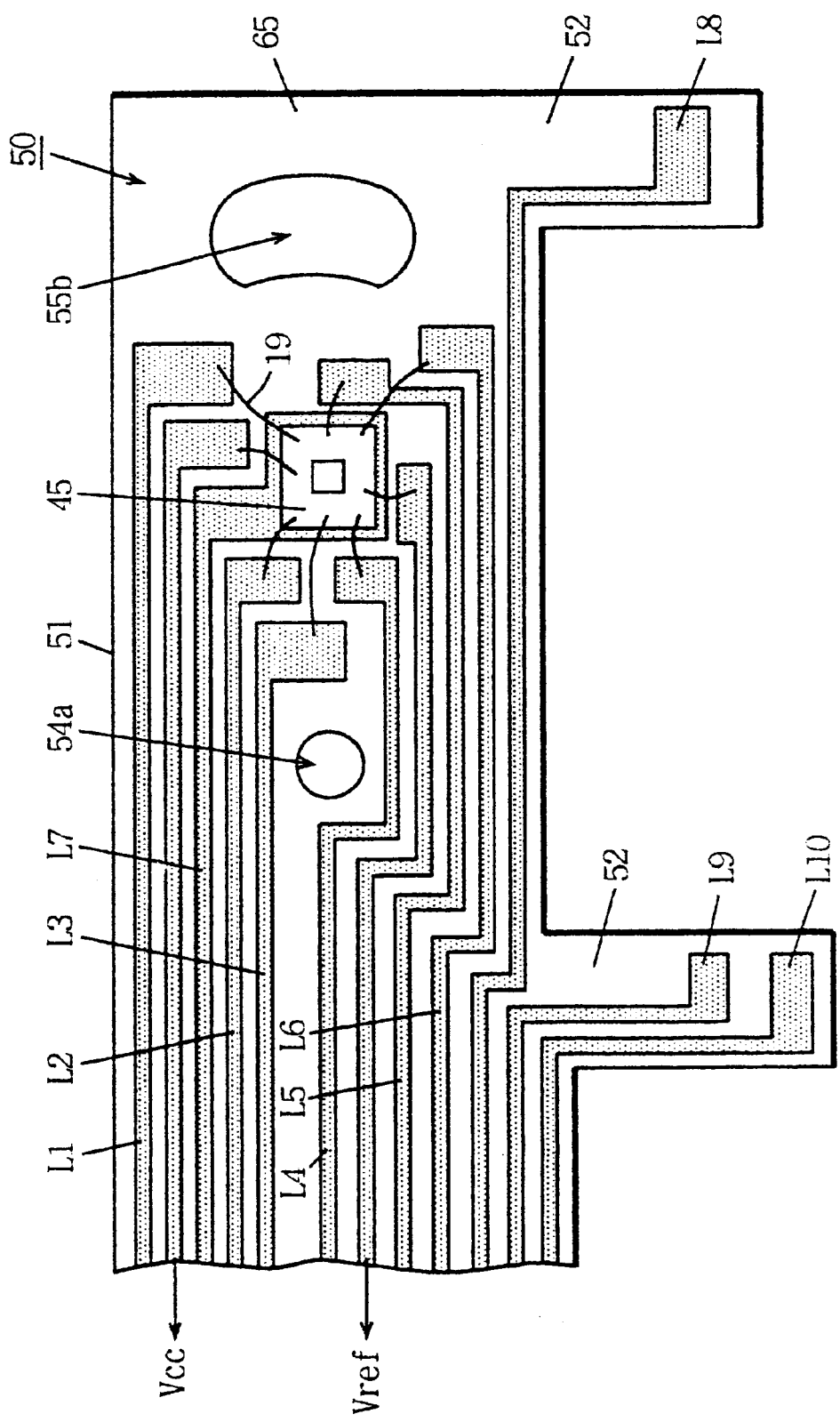
FIG. 14 is a plan view of a flexible circuit board of the optical pickup apparatus shown in FIG. 12.
Figure 15A:
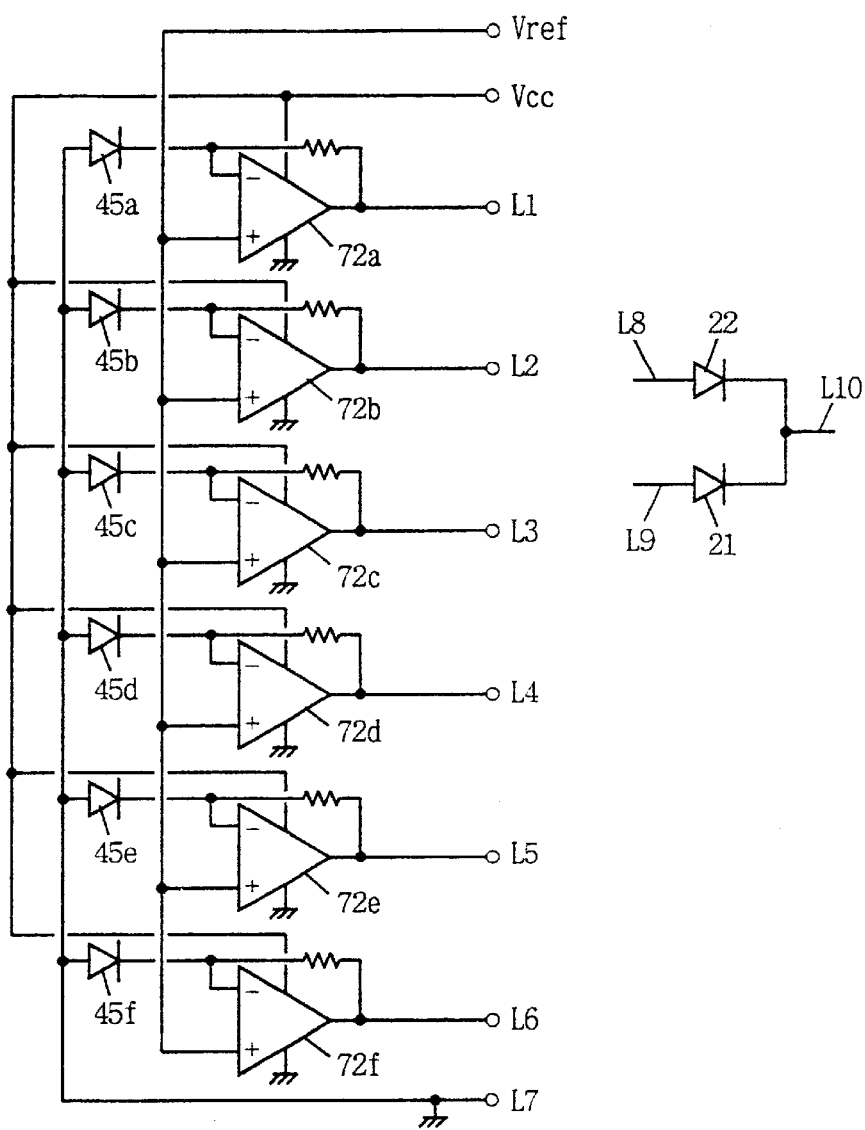
FIG. 15A is a circuit diagram of the flexible circuit board shown in FIG. 14.
Figure 15B:
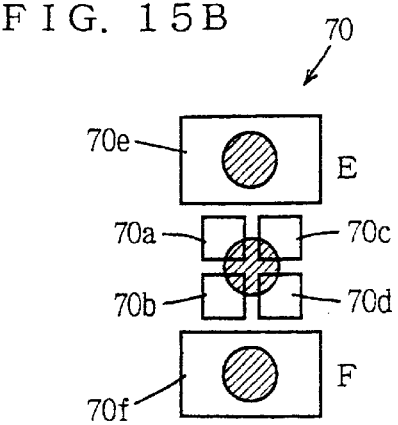
FIG. 15B is a plan view of photoreceiving parts of a PDIC mounted on the flexible circuit board.

FIG. 14 is a plan view of the flexible circuit board 50 employed in the optical pickup apparatus shown in FIG. 12, FIG. 15A illustrates exemplary wiring on the flexible circuit board 50 shown in FIG. 14, and FIG. 15B is a plan view of photoreceiving parts of the PDIC 45 arranged on the flexible circuit board 50 shown in FIG. 14.

As shown in FIG. 14, the flexible circuit board 50 is formed by a polyimide resin plate 65 provided with a plurality of conductive wiring layers L1 to L10. As shown in FIGS. 14, 15A and 15B, the wiring layers L1 to L6 are connected to output electrodes of the signal detection PDIC 45 through bonding wires, and the wiring layer L7 is connected to a GND electrode of the signal detection PDIC 45. The wiring layer L8 is connected to an anode of the monitor photodiode 22 through the lead 33b and a bonding wire, the wiring layer L9 is connected to an anode of the semiconductor laser device 22 through the lead 33a and a bonding wire 19, and the wiring layer L10 is connected to cathodes of the semiconductor laser device 21 and the monitor photodiode 22 in common through the lead frame 32.

The circular and elliptic screw through holes 54a and 55b are formed on both sides of the signal detection PDIC 45. Referring to FIGS. 15A and 15B, the signal detection PDIC 45 includes photodetection parts 70a to 70d provided on the central portion for performing focus servo control with the astigmatism method, photodetection parts 70e and 70f provided on both sides of the photodetection parts 70a to 70d for performing tracking servo control with the three-beam method, and operational amplifiers 72a to 72d. Detection signals of the photodetection parts 70a to 70d are outputted through the operational amplifiers 72a to 72d and four of the wiring layers L1 to L6, while those of the photodetection parts 70e and 70f for tracking servo control are outputted through the operational amplifiers 72e and 72f and the remaining two of the wiring layers L1 to L6. An adjusting circuit 71 (see FIG. 16) described later is connected to the wiring layers connected to the photodetection parts 70e and 70f.

Figure 16:
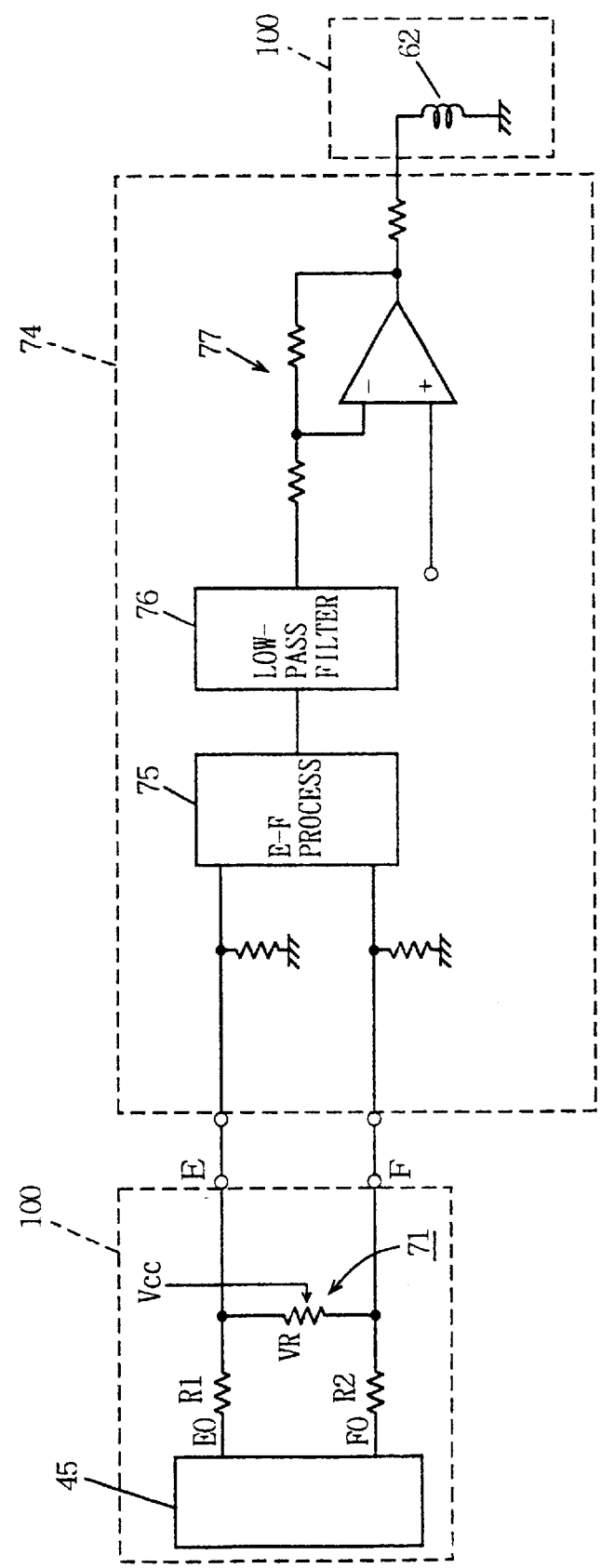
FIG. 16 is a circuit diagram of respective parts of the optical pickup apparatus shown in FIG. 12 for performing a tracking operation.

FIG. 16 shows the circuit structures of respective parts of the aforementioned optical pickup apparatus 100 for performing a tracking operation. The optical pickup apparatus 100 performs the tracking operation through an inspection driving circuit 74 in an inspection step. As shown in FIG. 16, the optical pickup apparatus 100 is provided with the adjusting circuit 71 in an intermediate stage of the wiring layers outputting the detection signals of the photodetection parts 70e and 70f of the signal detection PDIC 45. The adjusting circuit 71 has resistances R1 and R2 serially inserted in the wiring layers connected to the photodetection parts 70e and 70f and a variable resistor VR inserted between the wiring layers. A movable terminal of the variable resistor VR is connected to a power supply voltage Vcc. The resistance value of the variable resistor VR is changed thereby changing detection signals E0 and F0 outputted from the photodetection parts 70e and 70f of the signal detection PDIC 45 respectively. Thus, it is possible to generate and output a desired detection signal for correcting optical axis deviation of the objective lens 16 described later.

In this embodiment, the semiconductor laser device 21 corresponds to the light source, the diffraction grating 23 corresponds to the diffraction element, the signal detection PDIC 45 corresponds to the photodetector, and the adjusting circuit 71 corresponds to an adjusting part and the adjusting circuit.

In the optical pickup apparatus having the aforementioned structure, the housing provided with the objective lens 16 and the projecting/photoreceiving unit provided with the semiconductor laser device 21 and the like are integrally assembled with each other in alignment. In the assembling step for the optical pickup apparatus, the mounting position of the objective lens 16 with respect to the optical axis of the laser beam B emitted from the semiconductor laser device 21 may deviate in the radial direction (the X-axis direction) of the optical disk 1 due to an assembling error.

Therefore, the aforementioned optical pickup apparatus 100 is provided with the inspection driving circuit 74 as shown in FIG. 16, for adjusting the resistance value of the variable resistor VR of the adjusting circuit 71 provided on the optical pickup apparatus 100 and correcting the deviation of the objective lens 16.

First, the optical pickup apparatus 100 is mounted on a prescribed position of an inspection apparatus (not shown), and the semiconductor laser device 21 irradiates the optical disk 1 with the laser beam, for forming the main spot for reproduction and the two subspots for tracking state detection. The signal detection PDIC 45 receives the returned beams corresponding to the main spot and the subspots respectively, and outputs the detection signals E0 and F0 corresponding to the received light quantities. The detection signals E0 and F0 pass through the adjusting circuit 71, to be outputted from output terminals of the flexible circuit board 50 to the inspection driving circuit 74 as detection signals E and F.

The inspection driving circuit 74 has an E-F processing part 75, a low-pass filter 76 and an operational amplifier 77. The E-F processing part 75 calculates a tracking error signal TE (=E−F) on the basis of the detection signals E and F outputted from the optical pickup apparatus 100. In this inspection step, the tracking error signal TE is employed not for actually performing tracking but for supplying the tracking coil 62 with a bias voltage for forcibly moving the deviating objective lens 16 along the radial direction of the optical disk 1. This tracking error signal TE passes through the low-pass filter 76 and is amplified by the operational amplifier 77, to be supplied to the tracking coil 62. Thus, the objective lens 16 is moved along the radial direction of the optical disk 1 in response to the tracking error signal TE.

Figure 32:
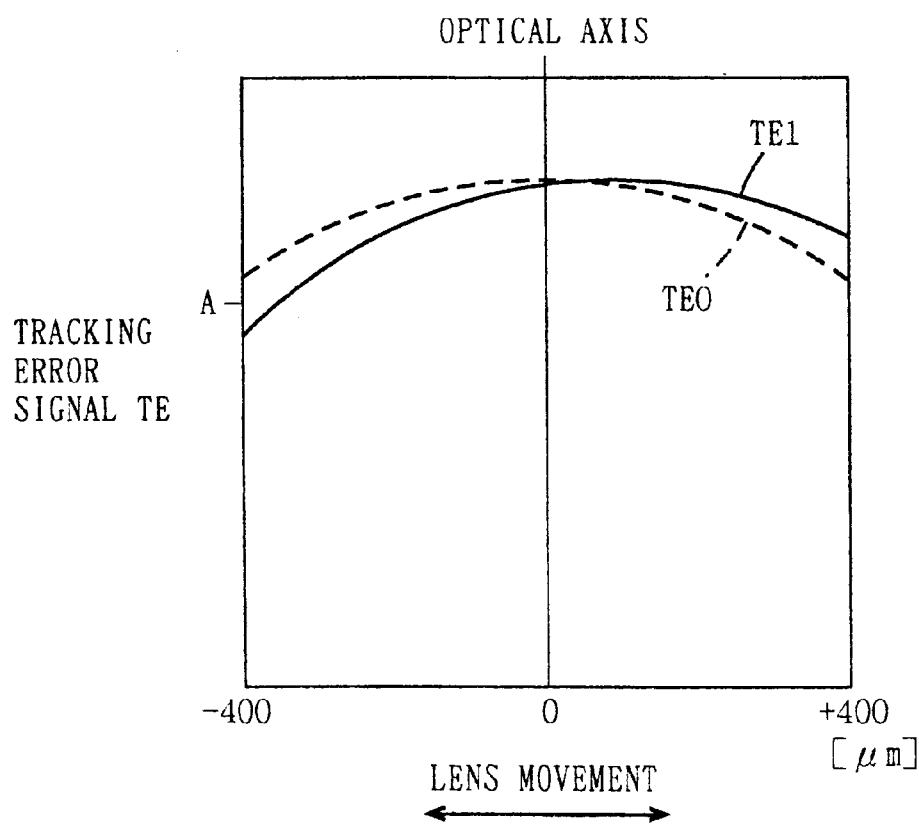
FIG. 32 illustrates change of a tracking error signal following movement of the objective lens.

Adjustment of the adjusting circuit 71 is performed as follows: The inspector supplies a constant driving signal to the tracking coil 62 for moving the objective lens 16 along the radial direction of the optical disk 1 toward the center and the outer periphery respectively by a constant distance of 400 μm, for example, and compares the voltages of the tracking error signal TE with each other. If the tracking error signal TE exhibits different values following movement in the opposite directions as shown in FIG. 32, the inspector adjusts the resistance value of the variable resistor VR of the adjusting circuit 71 for changing the voltages of the detection signals E0 and F0 and equalizing the values of the tracking error signal TE with each other. Thus, the adjusting circuit 71 adds a constant bias voltage to the driving signal applied to the tracking coil 62, for correcting the deviation of the objective lens 16.

Figure 17:
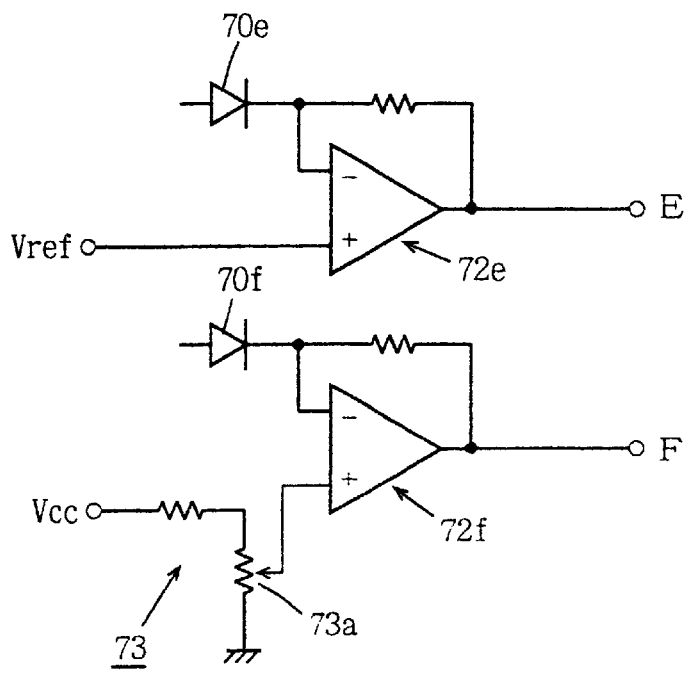
FIG. 17 is a circuit diagram showing a part around an adjusting circuit of an optical pickup apparatus according to a modification of the third embodiment of the present invention.

FIG. 17 is a circuit diagram of an adjusting circuit 73 according to a modification of this embodiment. In the optical pickup apparatus shown in FIG. 17, operational amplifiers 72e and 72f for amplification are provided on output sides of photodetection parts 70e and 70f respectively. A reference voltage Vref is inputted in a first input part of the operational amplifier 72e provided for the photodetection part 70e. This operational amplifier 72e amplifies the difference between a detection signal from the photodetection part 70e and the reference voltage Vref, and outputs the same as a detection signal E.

The adjusting circuit 73 is connected to a first input side of the operational amplifier 72f. The adjusting circuit 73 is connected to a power supply voltage Vcc, to be capable of changing the voltage of a reference signal inputted in the operational amplifier 72f by adjusting a variable resistor 73a. The operational amplifier 72f amplifies the difference between a detection signal from the photodetection part 70f and the reference signal from the adjusting circuit 73 and outputs the same as a detection signal F. The adjusting circuit 73 can change the value of the detection signal F. Thus, a bias voltage for correcting deviation of the objective lens 16 can be added to the tracking error signal TE calculated by the E-F processing part 75. Consequently, the objective lens 16 is moved in the radial direction by the driving signal supplied to the tracking coil 62, for correcting deviation of the objective lens 16 and the optical axis of the laser beam B in the radial direction.

In this embodiment, the photodetection parts 70a to 70f and the operational amplifiers 72a to 72f (amplifier parts) are formed on a single chip.

The operational amplifiers 72e and 72f of this embodiment correspond to the amplifier part of the present invention.

Figure 18:
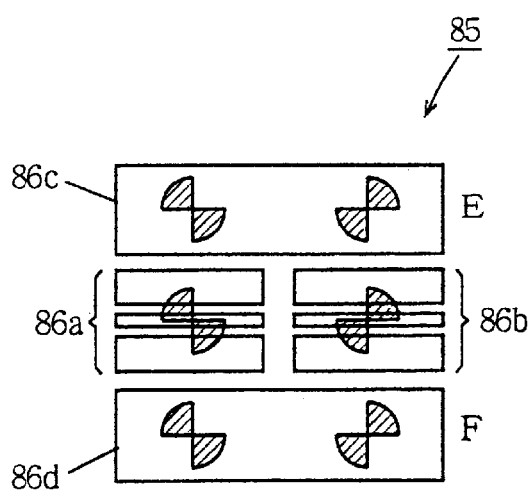
FIG. 18 is a plan view showing another exemplary photoreceiving part of a signal detection PDIC.

FIG. 18 shows another exemplary signal detection PDIC 45. A photoreceiving part 85 of this signal detection PDIC 45 comprises a pair of photodetection parts 86a and 86b for focus servo control and a pair of photodetection parts 86c and 86d for tracking servo control which are arranged to be opposed to the photodetection parts 86a and 86b. In response to this photodetection parts of the signal detection PDIC 45, a holographic surface of the transmission-type holographic optical element 24 is divided into four regions having different shapes. The adjusting circuit 71 or 73 according to the third embodiment or the modification thereof can also be provided on the signal detection PDIC 45 having such photodetection parts 86a to 86d.

Thus, the optical pickup apparatus according to this embodiment comprises the adjusting circuit 71 or 73 and is capable of correcting deviation of the objective lens 16 by itself, whereby a manufacturer for an apparatus to be assembled with the optical pickup apparatus requires no operation for adjusting deviation of the objective lens 16.

(4) Fourth Embodiment

Figure 19:
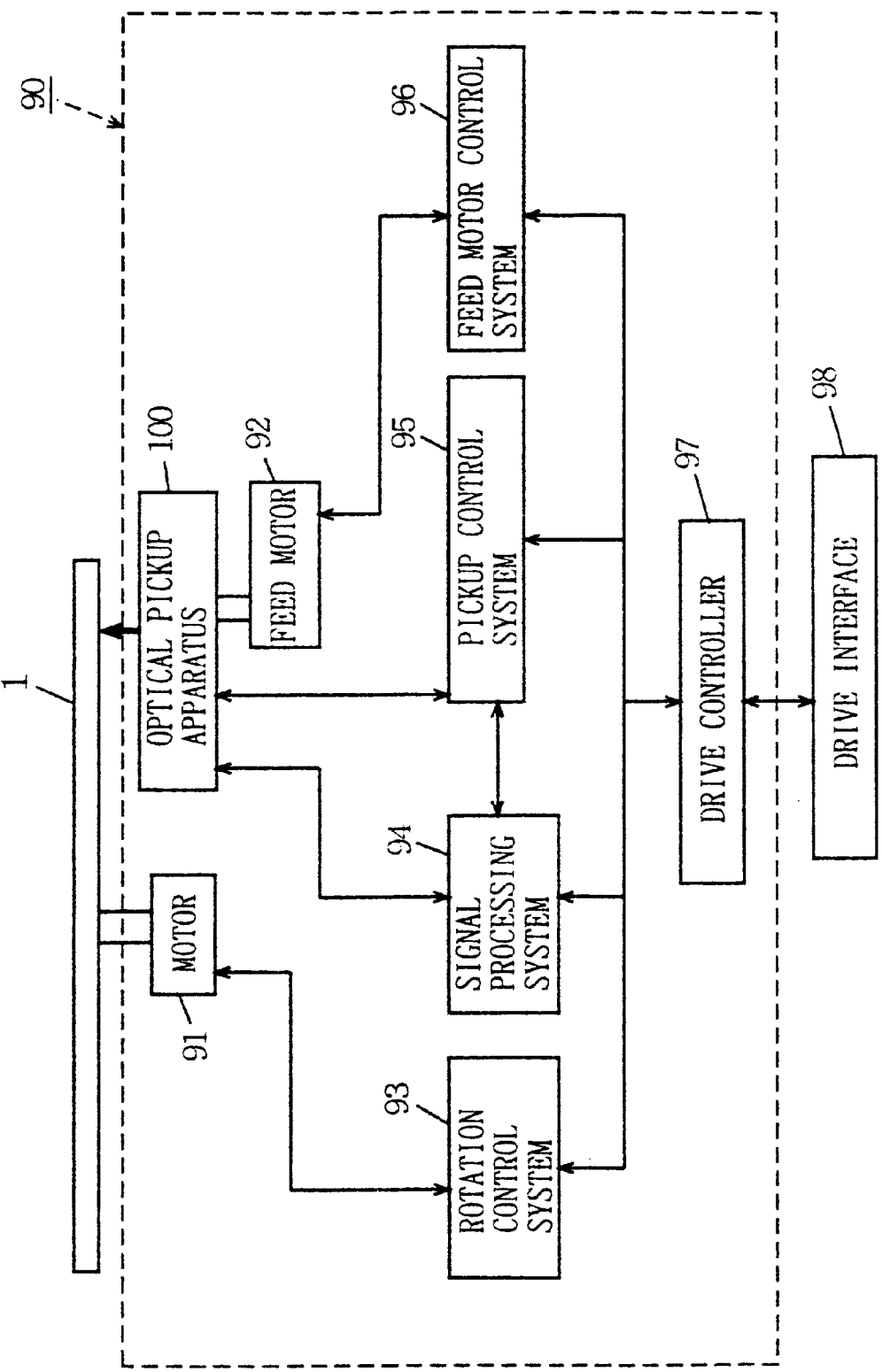
FIG. 19 is a block diagram of an optical recording medium drive according to a fourth embodiment of the present invention.
Figure 20:
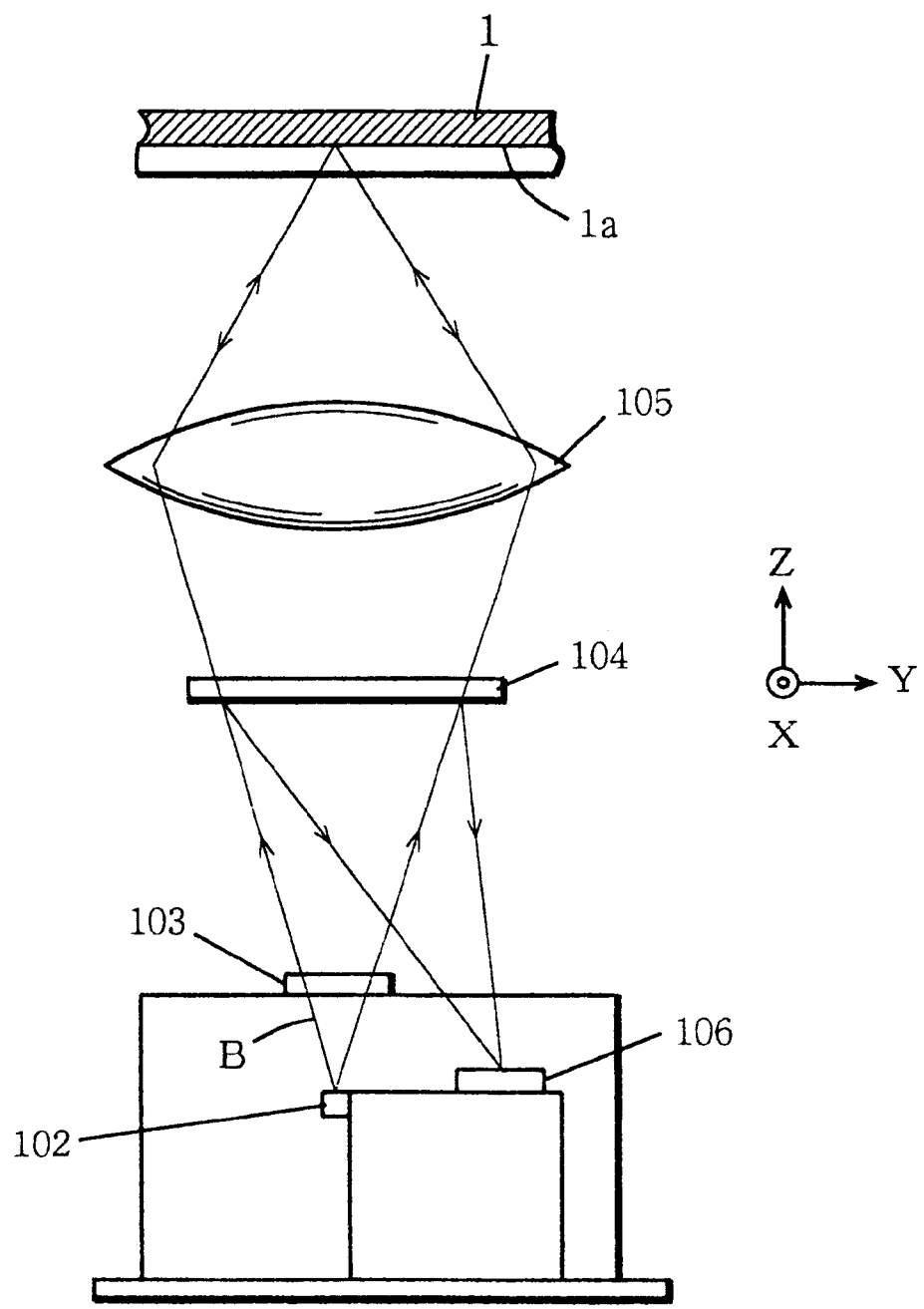
FIG. 20 is a schematic block diagram of a conventional optical pickup apparatus.

FIG. 19 is a block diagram showing the structure of an optical recording medium drive 90 employing the optical pickup apparatus 100 according to any of the first to third embodiments of the present invention. The optical recording medium drive 90 shown in FIG. 19 is an optical disk drive for reading information from an optical disk 1. The optical recording medium drive 90 includes the optical pickup apparatus 100, a motor 91, a feed motor 92, a rotation control system 93, a signal processing system 94, a pickup control system 95, a feed motor control system 96 and a drive controller 97.

The motor 91 rotates the optical disk 1 at a prescribed speed. The rotation control system 93 controls the rotating operation of the motor 91. The feed motor 92 moves the optical pickup apparatus 100 in the radial direction of the optical disk 1. The feed motor control system 96 controls the operation of the feed motor 92. The optical pickup apparatus 100 irradiates the optical disk 1 with a laser beam and receives a returned beam from the optical disk 1. The pickup control system 95 controls the projecting/photoreceiving operation of the optical pickup apparatus 100. The signal processing system 94 receives a detection signal from the signal detection PDIC 45 of the optical pickup apparatus 100 and calculates a reproduction signal, a focus error signal and a tracking error signal, for supplying the reproduction signal to the drive controller 97 while supplying the focus error signal and the tracking error signal to the pickup control system 95. The drive controller 97 controls the rotation control system 93, the signal processing system 94, the pickup control system 95 and the feed motor control system 96 in accordance with an instruction supplied through the drive interface 98, and outputs the reproduction signal through the drive interface 98. According to this embodiment, the motor 91 and the rotation control system 93 corresponds to the pickup driving part, and the signal processing system 94 corresponds to the signal processing part.

When the optical recording medium drive 90 shown in FIG. 19 employs the optical pickup apparatus 100 according to the first embodiment, it is possible to suppress output fluctuation of the tracking error signal resulting from movement of the objective lens in the tracking operation, for performing the tracking operation in high accuracy.

When employing the optical pickup apparatus 100 according to the second embodiment, it is possible to perform the tracking operation in high accuracy while suppressing offset of the tracking error signal resulting from optical axis deviation of the laser beam. When employing the optical pickup apparatus 100 according to the third embodiment, deviation of the objective lens may not be adjusted and the assembling operation is simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup apparatus capable of detecting a tracking state of a beam for reading information from an optical recording medium, said optical pickup apparatus comprising:

a light source for emitting a beam;

a first diffraction element for dividing said beam emitted from said light source into a plurality of beams for tracking state detection;

an objective lens being provided to be movable in the radial direction of said optical recording medium for condensing said plurality of beams divided by said first diffraction element on said optical recording medium;

a photodetector having a plurality of photoreceiving parts for receiving a plurality of returned beams based on said plurality of beams for tracking state detection condensed on said optical recording medium respectively and outputting detection signals responsive to received light quantities;

an adjusting circuit for correcting deviation of said objective lens and capable of changing at least one of said detection signals outputted from said plurality of photoreceiving parts of said photodetector relatively to another of said detection signals; and a lens driving part for moving said objective lens in said radial direction in response to a prescribed signal being based on the detection signal adjusted by said adjusting circuit.

2. The optical pickup apparatus in accordance with claim 1, wherein said adjusting circuit includes a variable resistor for changing said plurality of detection signals outputted from said plurality of photoreceiving parts of said photodetector.

3. The optical pickup apparatus in accordance with claim 2, further comprising a wiring part for extracting said signals from said plurality of photoreceiving parts of said photodetector, said variable resistor being arranged on said wiring part.

4. The optical pickup apparatus in accordance with claim 3, wherein said wiring part is formed on a flexible circuit board.

5. The optical pickup apparatus in accordance with claim 1, further comprising a plurality of amplifier parts being provided in correspondence to said plurality of photoreceiving parts in said photodetector for amplifying the differences between said detection signals outputted from corresponding said photoreceiving parts and a reference signal respectively, said adjusting circuit including a variable resistor for changing said reference signal being supplied to at least one of said plurality of amplifier parts.

6. The optical pickup apparatus in accordance with claim 5, wherein said photoreceiving parts and said plurality of amplifier parts are formed on a single chip.

7. The optical pickup apparatus in accordance with claim 1, further comprising a second diffraction element for transmitting said plurality of beams divided by said first diffraction element and guiding the same to said objective lens while diffracting said plurality of returned beams from said optical recording medium and guiding the same to said photodetector.

8. An optical pickup apparatus capable of detecting a tracking state of a beam for reading information from an optical recording medium, said optical pickup apparatus comprising:

a light source for emitting a beam;

a first diffraction element for dividing said beam emitted from said light source into a plurality of beams for tracking state detection;

an objective lens being provided to be movable in the radial direction of said optical recording medium for condensing said plurality of beams divided by said first diffraction element on said optical recording medium;

a photodetector having a plurality of photoreceiving parts for receiving a plurality of returned beams based on said plurality of beams for tracking state detection condensed on said optical recording medium respectively and outputting detection signals responsive to received light quantities;

a wiring part for extracting said detection signals from said plurality of photoreceiving parts of said photodetector;

an adjusting circuit for correcting deviation of said objective lens and capable of changing at least one of said detection signals outputted from said plurality of photoreceiving parts of said photodetector; and a lens driving part for moving said objective lens in said radial direction in response to a prescribed signal being based on the detection signal adjusted by said adjusting circuit, said adjusting circuit being arranged on said wiring part.

9. The optical pickup apparatus in accordance with claim 8, wherein said adjusting circuit includes a variable resistor for changing said plurality of detection signals outputted from said plurality of photoreceiving parts of said photodetector.

10. The optical pickup apparatus in accordance with claim 8, wherein said wiring part is formed on a flexible circuit board.

11. The optical pickup apparatus in accordance with claim 8, further comprising a plurality of amplifier parts being provided in correspondence to said plurality of photoreceiving parts in said photodetector for amplifying the differences between said detection signals outputted from corresponding said photoreceiving parts and a reference signal respectively, said adjusting circuit including a variable resistor for changing said reference signal being supplied to at least one of said plurality of amplifier parts.

12. The optical pickup apparatus in accordance with claim 11, wherein said photoreceiving parts and said plurality of amplifier parts are formed on a single chip.

13. The optical pickup apparatus in accordance with claim 8, further comprising a second diffraction element for transmitting said plurality of beams divided by said first diffraction element and guiding the same to said objective lens while diffracting said plurality of returned beams from said optical recording medium and guiding the same to said photodetector.

* * * * *